(12) United States Patent
Ishizuya

(10) Patent No.: US 12,374,494 B2
(45) Date of Patent: Jul. 29, 2025

(54) ELECTRONIC COMPONENT

(71) Applicant: TDK CORPORATION, Tokyo (JP)

(72) Inventor: Masahide Ishizuya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 390 days.

(21) Appl. No.: 17/731,471

(22) Filed: Apr. 28, 2022

(65) Prior Publication Data

US 2022/0351905 A1 Nov. 3, 2022

(30) Foreign Application Priority Data

Apr. 28, 2021 (JP) ................... 2021-076099

(51) Int. Cl.
*H01G 4/224* (2006.01)
*H01G 4/232* (2006.01)
*H01G 4/30* (2006.01)

(52) U.S. Cl.
CPC ............. *H01G 4/224* (2013.01); *H01G 4/232* (2013.01); *H01G 4/30* (2013.01)

(58) Field of Classification Search
CPC ..................................................... H01G 4/224
See application file for complete search history.

(56) References Cited

U.S. PATENT DOCUMENTS

| | | | |
|---|---|---|---|
| 11,749,458 B2* | 9/2023 | Tahara | H01G 4/30 |
| | | | 361/301.4 |
| 2017/0076865 A1 | 3/2017 | Tanaka et al. | |
| 2020/0075260 A1* | 3/2020 | Yun | H01G 4/30 |
| 2020/0194151 A1 | 6/2020 | Yanai et al. | |
| 2021/0020367 A1 | 1/2021 | Yun et al. | |
| 2021/0193389 A1* | 6/2021 | Kim | H01G 4/012 |
| 2021/0304969 A1* | 9/2021 | Ishii | H01G 4/1227 |
| 2022/0076889 A1 | 3/2022 | Yun et al. | |
| 2022/0310291 A1 | 9/2022 | Yanai et al. | |

FOREIGN PATENT DOCUMENTS

| | | | |
|---|---|---|---|
| CN | 107039178 A | | 8/2017 |
| JP | S62-237714 A | | 10/1987 |
| JP | 2011216821 A | * | 10/2011 |
| JP | 2017-147410 A | | 8/2017 |
| JP | 2020-202402 A | | 12/2020 |
| JP | 2021-019192 A | | 2/2021 |
| WO | 2019-073762 A1 | | 4/2019 |

* cited by examiner

*Primary Examiner* — Eric W Thomas
(74) *Attorney, Agent, or Firm* — Oliff PLC

(57) ABSTRACT

The electronic component includes an element body 4 having a plurality of side faces 5a to 5d along a circumference direction. The element body 4 includes insulation layers 16a to 16d covering the plurality of side faces 5a to 5d in a continuous manner along a circumference direction; and properties (a pore ratio, dielectric particle sizes, and so on) of the insulation layers 16a to 16d are substantially consistent along a circumference direction.

20 Claims, 25 Drawing Sheets

ELECTRONIC COMPONENT

TECHNICAL FIELD

The present disclosure relates to an electronic component such as a multilayer ceramic capacitor.

BACKGROUND

For example, regarding an electronic component such as a multilayer ceramic capacitor disclosed in Patent document 1, in order to increase an area of internal electrode layer while achieving a compact electronic component, Patent document 1 discloses to form a side-gap insulation layer constituted of dielectrics to a side surface of the element body where a side part of the internal electrode layer is exposed.

However, in a conventional multilayer ceramic capacitor, the side-gap insulation layer is for example formed using a coating method, and it is formed by sintering together with the element body. Therefore, in the convention a multilayer ceramic capacitor, it was difficult to control the area where the side-gap insulation layer is formed.

For example, in order to effectively protect the side face of element body where the side part of the internal electrode layer is exposed, the side edge of the side-gap insulation layer is formed so to cover the end face of the element body as well. By doing so, the exposed end of the insulation layer which is exposed to the end face of the element body may be covered as well. In such case, the exposed end of the internal electrode layer which is exposed to the end part of the element body may result in insufficient connection with a terminal electrode formed to the end face of the element body.

Particularly, when the element body is downsized, it becomes difficult to form the insulation layer only to the side face of the element body in a way which does not cover the exposed end of the internal electrode layer exposed to the end face of the element body. Also, when the insulation layer is only formed to the side face of the element body, the insulation layer could be easily released from the element body from a corner part formed between two side faces. When the insulation layer is released from the element body, and problems such as a short circuit or so may occur.

[Patent Document 1] JP Patent Application Laid Open No. S62-237714

SUMMARY

The present disclosure is attained in view of such circumstances, and the object is to provide an electronic component which can be easily produced easily and also attaining an excellent reliability.

In order to achieve the above object, the electronic component according to the present disclosure includes an element body having a plurality of side faces along a circumference direction, wherein
  the element body includes an insulation layer which covers the plurality of side faces in a continuous manner along the circumference direction, and
  a property of the insulation layer is substantially consistent along the circumference direction.

Note that, "substantially consistent" in above means that ±5% or so of fluctuation is allowed.

By constituting as such, a boundary between the insulation layer and the element body can be prevented from contacting with outside air and moisture entering from the boundary is prevented, thus a reliability of the electronic component improves. The property of the insulation layer is substantially consistent along a circumference direction. Therefore, even in case the electronic component is a compact size, the insulation layer is rarely released from the corner part of the element body, and chances of experiencing the short circuit is low. Also, since the property of the insulation layer is substantially consistent along a circumference direction, the stress applied to the electronic component can be evenly dispersed, and releasing of the insulation layer can be prevented.

Also, since the side-gap insulation layer can be formed using a rolling transfer method, the insulation layer is not formed to an unnecessary part which is different from a coating method. Hence, at the end face of the element body where the terminal electrode is formed and connects with the internal electrode layer, the insulation layer is not substantially formed. As a result, even when the element body is downsized, a connection reliability between the ternal electrode and the internal electrode is improved.

The insulation layer of the electronic component according to the present disclosure covers the plurality of side faces of the element body in a continuous manner along the circumference direction. Thus, the insulation layer having approximately consistent quality can be formed to parts other than the side-gap insulation layer. Particularly, the insulation layer with a consistent property is formed to the corner part formed between the two side faces of the element body. Also, unlike an edge of the insulation layer formed using a coating method, in the electronic component according to the present disclosure, the edge of the insulation layer does not necessarily have to be formed close to the corner part formed between two side faces of the element body.

In the conventional electronic component, an edge of the insulation layer formed using a coating method needs to be positioned near the corner part formed between the side faces of the element body so that an area of an end face of the element body which becomes a connecting end face with the terminal electrode is not narrowed down. On the contrary to this, in the electronic component according to the present disclosure, the insulation layer is formed using a rolling transfer method, thus the insulation layer having a consistent property is formed even at an area close to the corner part formed between the side faces of the element body. Hence, unlike the conventional electronic component, an edge of the thin insulation layer is not formed around the corner part. Therefore, this can effectively prevent moisture from entering, hence the moisture resistance and the reliability of the electronic component is improved. Further, the insulation layer is rarely released from the corner part of the element body, and a short circuit rarely occurs.

Preferably, a pore ratio at a predetermined depth from a surface of the insulation layer on a corner part of the element body may be substantially the same as a pore ratio at a predetermined depth from the surface of the insulation layer on at least one side face among two side faces of the plurality of side faces of the element body connecting to the corner part.

In the electronic component according to the present disclosure, the insulation layer having approximately consistent property (for example, the pore ratio is approximately consistent) is formed even at the corner part of the element body. Therefore, this can effectively prevent moisture from entering, hence the moisture resistance and the reliability of the electronic component is improved. Further, the insulation layer is rarely released from the corner part of the element body, and a short circuit rarely occurs.

Preferably, the pore ratio at the predetermined depth from the surface of the insulation layer is substantially consistent along the circumference direction. The property of the insulation layer (such as the pore ratio) is substantially consistent along a circumference direction across the plurality of side faces of the element body. Thus, the insulation layer is rarely released from the corner part of the element body, and a short circuit rarely occurs.

Preferably, the insulation layer includes ceramic particles, and the particle sizes of the ceramic particles at the predetermined depth from the surface of the insulation layer are substantially the same along the circumference direction. Properties of the insulation layer (such as the pore ratio) are substantially consistent along a circumference direction across the plurality of side faces of the element body. Thus, the insulation layer is rarely released from the corner part of the element body, and a short circuit rarely occurs.

The insulation layer may include dielectrics having a composition substantially the same or different of dielectrics included in a dielectric layer of the element body. When the composition of the insulation layers and the dielectric layers are substantially the same, the element body and the insulation layer can be fired together. Preferably, the insulation layer may include a larger amount of a component which can improve a sinterability.

The element body may be a multilayer structure in which the internal electrode layer and the ceramic layer are stacked. Also, a terminal electrode connecting with an exposed end of the internal electrode layer may be formed at an end face of the element body which is located to cross with the plurality of side faces of the element body. Further, an edge of the terminal electrode may preferably cover an end of the insulation layer. By constituting as such, moisture can hardly enter inside the element body, thus the moisture resistance of the electronic component improves and also improves the reliability of the electronic component.

Preferably, the plurality of side faces continuous along the circumference direction of the element body may be entirely covered by the insulation layer. By constituting as such, the insulation layer is even more effectively prevented from being released of the element body. Also, a path to enter into the boundary between the insulation layer and the element body can be blocked across the entire circumference of the side faces of the element body, hence the moisture resistance and the reliability of the electronic component can be further improved.

Note that, the plurality of side faces continuous along the circumference direction of the element body may not be necessarily entirely covered by the insulation layer, and the insulation layer may have a discontinuous part on one side face among the plurality of side faces of the element body. That is, at one side face among the plurality of side faces of the element body, edges of the insulation layer may be positioned near the center area which is away from the corner part of one side face and in a perpendicular direction with the circumference direction. The edges of the insulation layer may be discontinuous at such center area of the side face, and the side face of the element body may be partially exposed from this discontinuous part.

Preferably, the insulation layer may have an approximately uniform composition along the circumference direction. Since the composition of the insulation layer is roughly the same, the insulation layer has a moisture resistance consistent along the circumference direction, which reduces the number of starting points causing a decrease in the moisture resistance, thus the reliability of the electronic component can be improved. Note that, by forming the insulation layer using a rolling transfer method, the insulation layer having approximately uniform composition in a circumference direction can be easily formed.

Preferably, a thickness of the insulation layer may be within a range of 3 μm to 40 μm. Further preferably, the thickness of the insulation layer may be approximately uniform along the circumference direction. By forming the insulation layer having a uniform thickness, the number of starting points which could cause decrease in the moisture resistance is reduced and the moisture resistance of the electronic component can be improved, thus the reliability of the electronic component can be improved. The insulation layer can be formed using a rolling transfer method; hence the thickness of the insulation layer tends to easily become substantially uniform along the circumference direction.

BRIEF DESCRIPTION OF THE SEVERAL VIEWS OF THE DRAWINGS

FIG. 2Aa shows partial enlarged figure of the cross section indicated in FIG. 2A.

FIG. 2Ab shows a modified example of a partial enlarged figure indicated in FIG. 2Aa.

DETAILED DESCRIPTION

Hereinafter, the present disclosure is described based on the embodiments shown in the figures.

First Embodiment (Overall Structure of Multilayer Ceramic Capacitor)

As one embodiment of an electronic component according to the present embodiment, overall structure of a multilayer ceramic capacitor is described.

Figure 1:
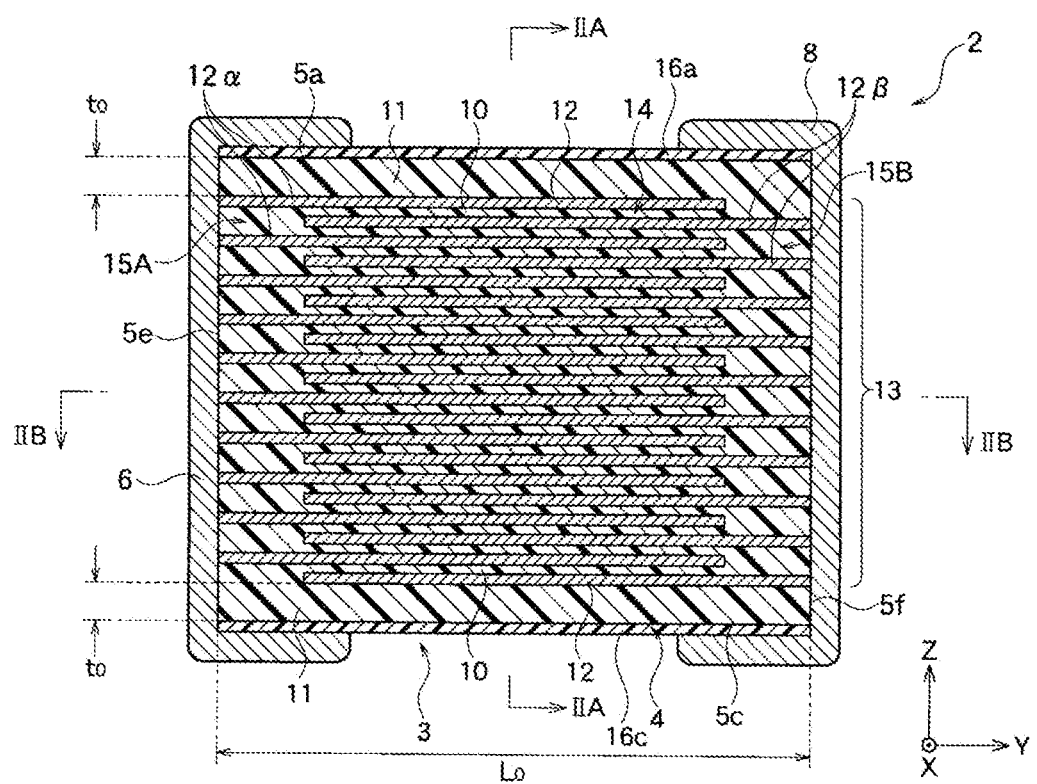
FIG. 1 shows a schematic cross section of a multilayer ceramic capacitor according to an embodiment of the present disclosure.

As shown in FIG. 1, a multilayer ceramic capacitor 2 according to the present embodiment includes a multilayer body (element body) 4 made of a ceramic sintered body, a first terminal electrode 6, and a second terminal electrode 8.

As shown in FIG. 1, the multilayer body 4 includes an inner-dielectric layer (ceramic layer) 10 and an internal electrode layer 12 which are substantially parallel to a plane including X-axis and Y-axis. The internal electrode layer 12 and the inner-dielectric layer 10 are stacked in an alternating manner along Z-axis direction. Here, "substantially parallel" means that it is mostly parallel but some part may not necessarily be parallel, which means that the internal electrode layer 12 and the inner-dielectric layer 10 may contain somewhat of uneven surface, or may be somewhat slanted. Note that, in the figures, X-axis, Y-axis, and Z-axis are perpendicular to each other.

An area where the inner-dielectric layer 10 and the internal electrode layer 12 are stacked in an alternating manner is an interior area 13. Also, the multilayer body 4 includes an exterior area 11 at both end faces in a stacking direction (Z-axis direction) of the multilayer body 4. The exterior area 11 is formed by stacking one or more of outer-dielectric layers. Note that, hereinafter, "inner-dielectric layer 10" and "outer-dielectric layer" may be referred as "dielectric layer (ceramic layer)".

A material of the dielectric layer constituting the inner-dielectric layer 10 and the exterior area 11 is not particularly limited, and it may be the same or different. For example, the material may include a dielectric material having a perovskite structure such as $ABO_3$ or an alkali niobate-based ceramic as a main component. Regarding the above-mentioned $ABO_3$, for example "A" is at least one selected from Ca, Ba, Sr, and the like; B is at least one selected from Ti, Zr, and the like. A molar ratio of A/B is not particularly limited, and it may be within a range of 0.980 to 1.020.

Figure 2A:
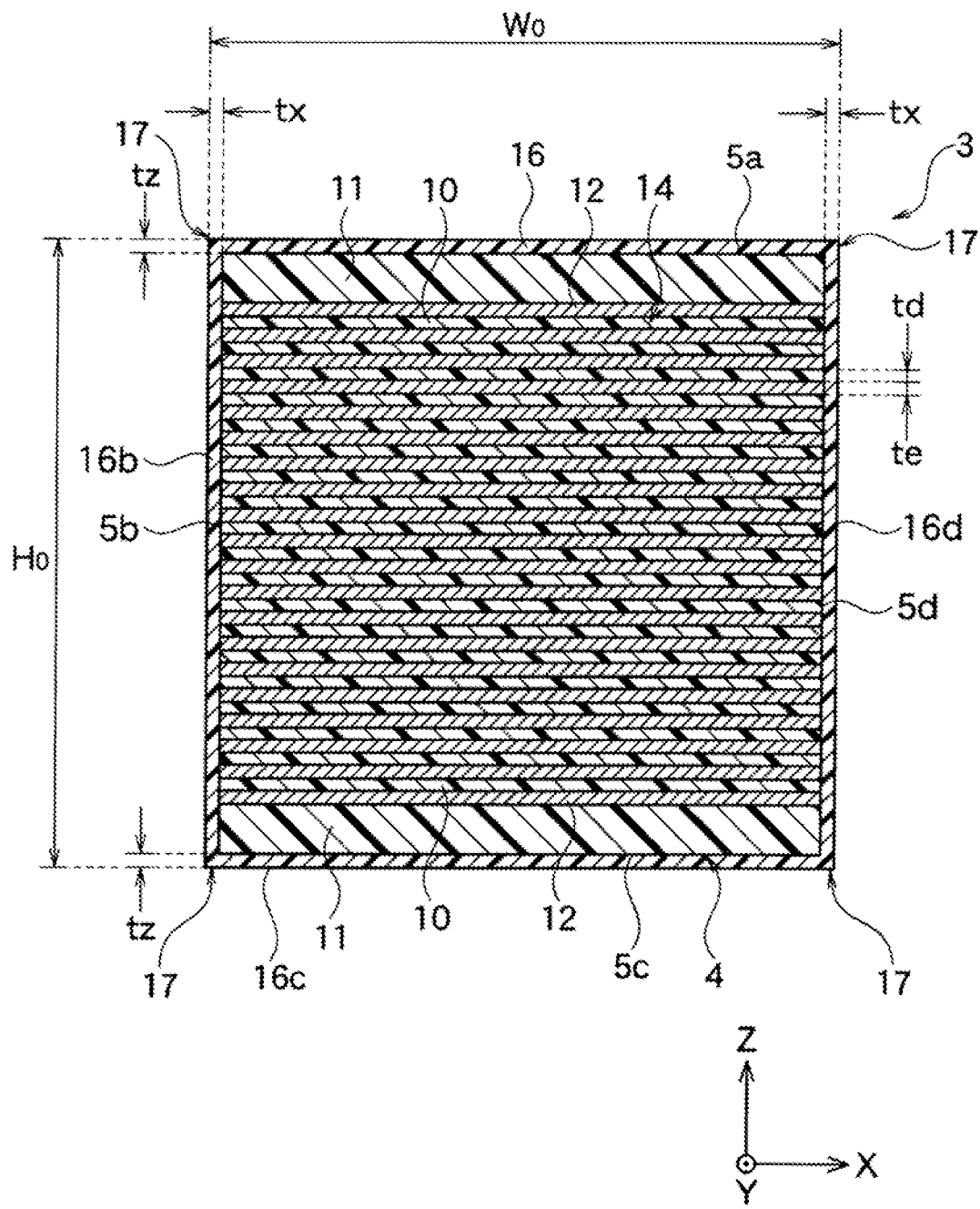
FIG. 2A shows a cross section along IIA-IIA line indicated in FIG. 1.
Figure 2A:
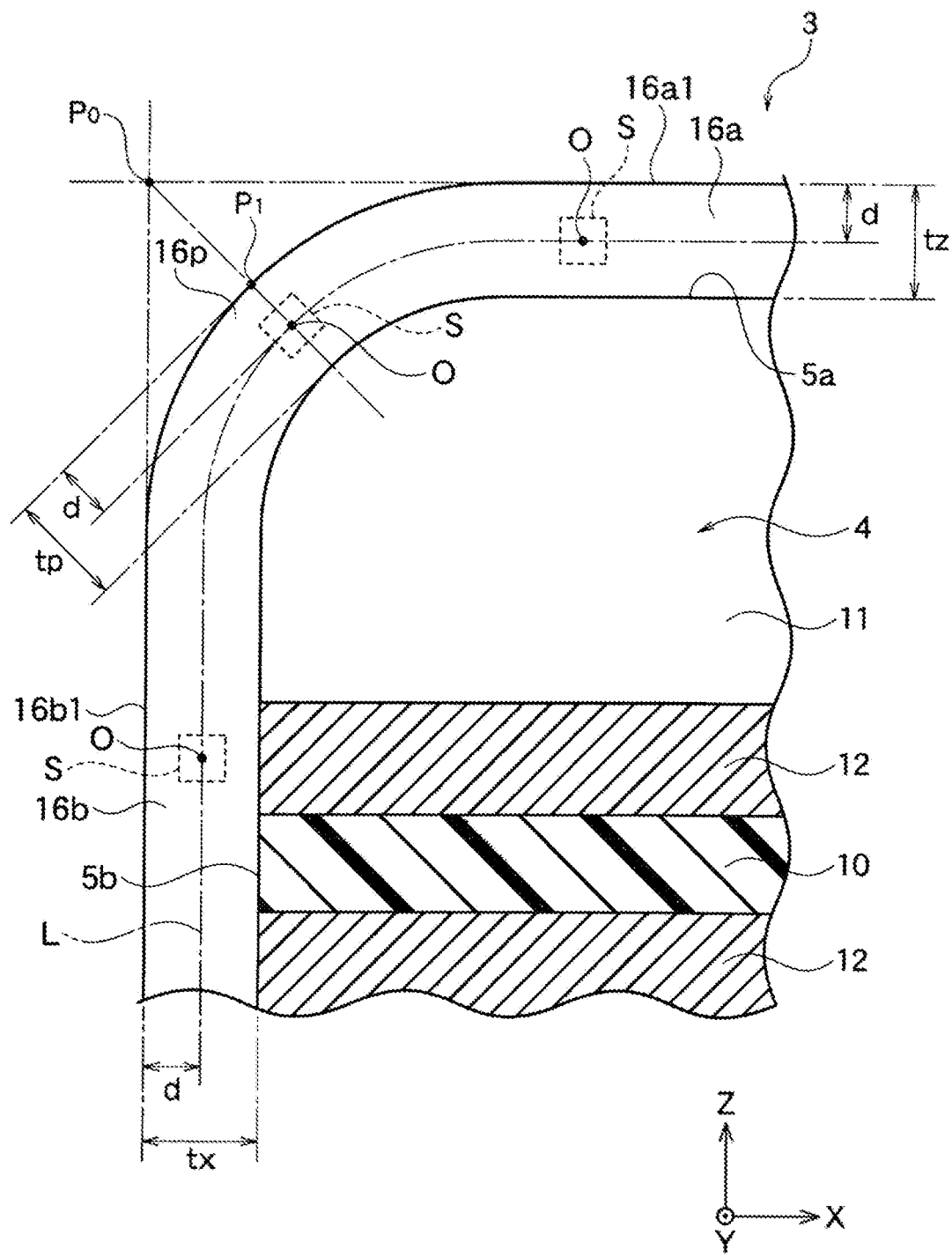
Figure 2A:
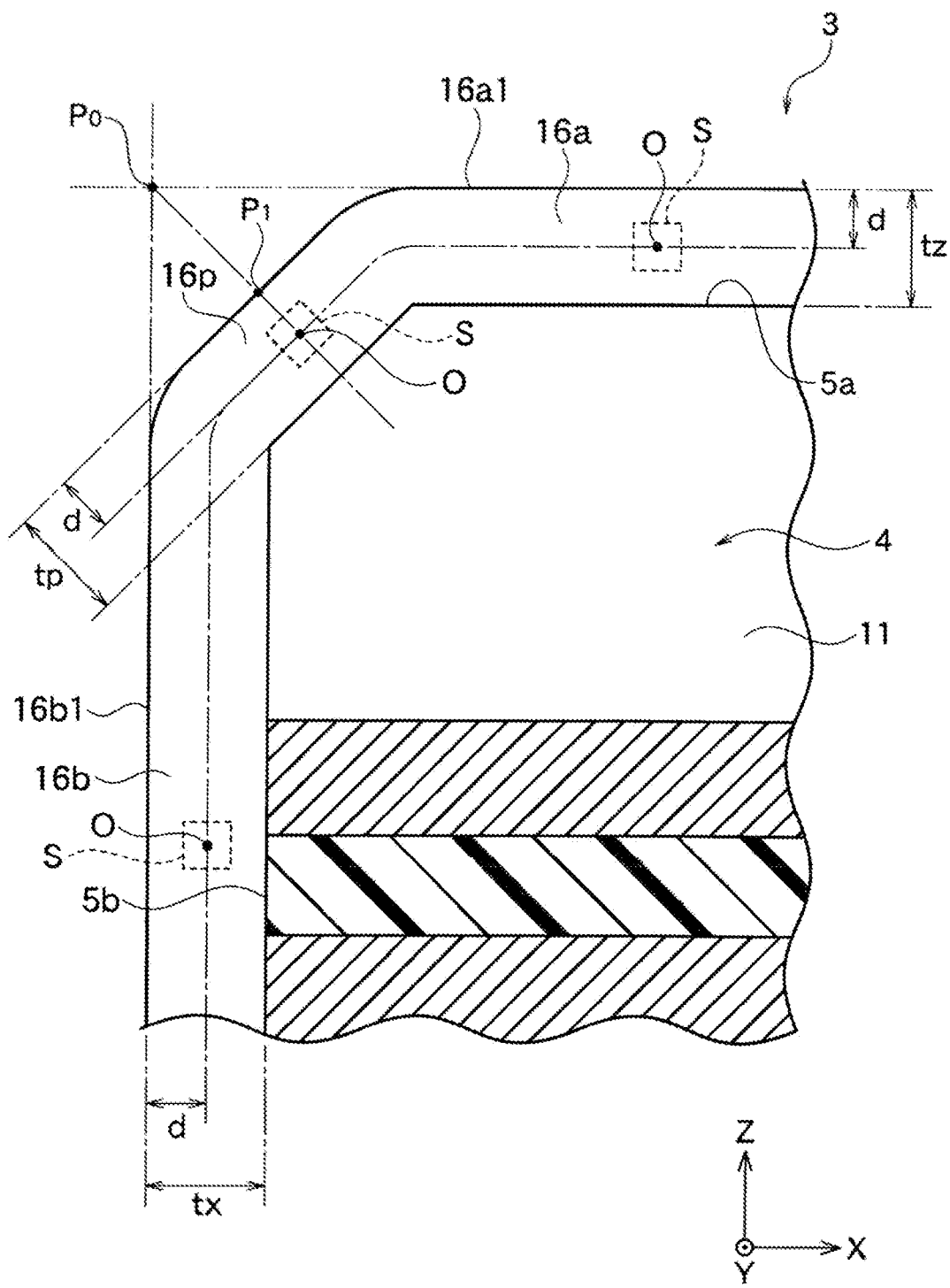

A number of stacked layers of inner-dielectric layers 10 and the outer-dielectric layers may be determined based on the intended use and so on. A thickness td of the inner-dielectric layer 10 shown in FIG. 2A is for example within a range of 0.1 μm to 40 μm. A ratio of the thickness td of the inner-dielectric layer 10 to a thickness to of the internal electrode layer 12 is not particularly limited, and td/te may preferably be within a range of 2 to 0.5. Also, a thickness t0 of the exterior area 11 (see FIG. 1) to a height H0 (see FIG. 2A) of the element body 3 with insulation layer is not particularly limited, and t0/H0 may be within a range of 0.01 to 0.1.

A shape and a size of the element body 3 win insulation layer may be determined depending on the purpose and the intended use; and a width W0 in X-axis direction is preferably within a range of 0.1 mm to 3.2 mm, a length L0 in Y-axis direction is preferably within a range of 0.2 mm to 3.2 mm, and a height H0 in Z-axis direction is preferably within a range of 0.1 mm to 3.2 mm. Note that, the multilayer ceramic capacitor 2 of which the element body with insulation layer including the first electrode and the second electrode layer 8 preferably also satisfies the size mentioned in the above.

As shown in FIG. 1, one internal electrode layer 12, which is one of internal electrode layers stacked in an alternating manner, has a lead part 12a electrically connecting to the inner side of the first terminal electrode 6 formed to an end face 5e which is one end in Y-axis direction of the multilayer body 4. Also, another internal electrode layer 12 which is one of internal electrode layers stacked in an alternating manner has a lead part 12β electrically connecting to the inner side of the second terminal electrode 8 formed to an end face 5f which is the other end in Y-axis direction of the multilayer body 4.

The interior area 13 includes a capacity area 14 and lead areas 15A and 15B. The capacity area 14 is an area formed where the inner-dielectric layer 10 is held between the internal electrode layers 12 along the stacking direction. The lead area 15A is an area positioned between the lead part 12α of the internal electrode layer 12 connecting to the terminal electrode 6. The lead area 15B is an area formed between the lead part 12β of the internal electrode layer 12 connecting to the terminal electrode 8.

A conductive material included in the internal electrode layer 12 is not particularly limited, and metals such as Ni, Cu, Ag, Pd, Al, Pt, and the like, and alloy thereof can be used. As a Ni-based alloy, an alloy of Ni and one more selected from Mn, Cr, Co, and Al is preferable. An Ni amount in the Ni-based alloy is preferably 95 wt % or more. Note that, Ni and the Ni-based alloy may include various trace amount components such as P and the like in an amount of about 0.1 wt % or less. The internal electrode layer 12 may be formed using a commercially available electrode layer, and a thickness of the internal electrode layer 12 may be determined based on the intended use.

In the present embodiment, as shown in FIG. 2A, the four side faces 5a to 5d of the multilayer body 4 as an element body are covered in a continuous manner by the insulation layers 16a to 16d which are continuous along the circumference direction. That is, to the side faces 5a and 5c positioned at the both sides along Z-axis direction of the multilayer body 4, and to the side faces 5b and 5d positioned at the both sides along X-axis direction of the multilayer body 4, the insulation layers 16a to 16d are respectively formed to cover the side faces 5a to 5d in a continuous manner along the circumference direction. Note that, in the present specification, a rotational direction around Y-axis of the multilayer body including the side faces 5a to 5d may be referred as a circumference direction or an outer circumference direction.

Note that, in the present embodiment, the constitution of each of the insulation layers 16a to 16d are substantially the same, hence hereinbelow for the sake of convenience, the insulation layer 16a and the insulation layer 16d are explained, and unless mentioned otherwise, the description regarding the insulation layer 16c and the insulation layer 16d will be omitted.

As shown in FIG. 2Aa, the insulation layer 16a formed on the side face 5a positioned at an upper side of Z-axis direction of the multilayer body 4 has substantially a uniform thickness in Z-axis direction. Here, the thickness tz is a shortest distance from an outer circumference face 16a1 of the insulation layer 16a to the side face 5a of the multilayer body 4 which are approximately parallel to X-Y plane. Also, the insulation layer 16b formed on the side face 5b positioned at one side of the multilayer body 4 of X-axis direction has substantially a uniform thickness tx along X-axis direction. Here, the thickness tx is a shortest distance from an outer circumference face 16b1 of the insulation layer 16b to the side face 5b of the multilayer body 4 which are approximately parallel to Y-Z plane. In the present embodiment, the thickness tx and the thickness tz are substantially the same.

Also, in the present embodiment, at a corner part 17 formed between the side face 5a and the side face 5b, a curved part having a predetermined radius of curvature is preferably formed, and a thickness tp of the insulation layer 16p on the corner part 17 is the same as at least one of the thickness tx and the thickness tz. Preferably, the thickness tp is substantially the same as both of the thickness tx and the thickness tz. Note that, the insulation layers 16a to 16d used in the present embodiment may also include the insulation layer 16p on the corner part 17.

Here, the corner part 17 refers to a corner part formed between the side face 5a and the side face 5b of the multilayer body 4 when the boundary between the insulation layers 16a and 16b can be clearly distinguished from the multilayer body 4. That is, the corner part 17 is located between the side face 5a and the side face 5b of the multilayer body 4. Also, when the boundary between the insulation layers 16a and 16b cannot be clearly distinguished from the multilayer body 4, then the corner part 17 is a corner part formed between the outer circumference face 16a1 of the insulation layer 16a and the outer circumference face 16b1 of the insulation layer 16b.

For example, a corner part is defined as an area having a line P1 as a center on the outer circumference face of the insulation layer where P1 is the closest point to an interception line P0. The interception line P0 is formed between a X-Y plane which is an extended surface of the outer circumference face 16a1 of the insulation layer 16a and a Y-Z plane which is an extended surface of the outer circumference face 16b1 of the insulation layer 16b. Also, the thickness tp of the insulation layer at the corner part 17 is defined as the shortest distance from P1 to the multilayer body 4.

Note that, when the insulation layers 16a to 16d and the dielectric layers 10 and 11 are constituted by the same materials, a boundary between the insulation layer 16b and the side edge in X-axis direction of the internal electrode layer 12 can be clearly measured from a cross section photo image of the multilayer body 4. Therefore, the thickness tx of the insulation layer 16b can be measured.

However, when the insulation layers 16a to 16d and the dielectric layers 10 and 11 are constituted by substantially the same materials, a boundary between the insulation layer 16b and the dielectric layers 10 and 11 is difficult to clearly measure from the cross-section photo image. Therefore, the thickness tz of the insulation layer 16a and the thickness tp of the insulation layer 16p may be actually difficult to measure in some case.

In the present embodiment, the predetermined depth d is defined as ½ of a minimum value of a preferable range of the thickness tx of the insulation layer 16b, and the pore ratios (void ratios) and so on at the predetermined depth d in the insulation layers 16a to 16b are measured. Thereby, the level of consistency of the properties in the circumference direction of the insulation layers 16a to 16b can be verified. The predetermined depth d is defined as a value within the range of 1.5 to 20 μm.

For example, in the present embodiment, the pore ratio at the predetermined depth d from the surface P1 of the insulation layer 16p on the corner part 17 is substantially the same as the pore ratio at the predetermined depth d from the surface of the insulation layers 16a and 16b on at least one side face among the two side faces 5a and 5b of the multilayer body 4 which connect with the corner part 17.

Note that, "the pore ratio at the predetermined depth d from the surface of the insulation layer 16p on the corner part 17 is substantially the same as the pore ratio at the predetermined depth d from the surface of the insulation layers 16a and 16b on at least one side face among the two side faces 5a and 5b of the multilayer body 4 which connects with the corner part 17" can be verified for example as described in below.

First, in order to obtain a pore ratio, a unit area S is determined. This unit area S has a position O as a center which is at a predetermined depth d from a position P1 of the insulation layer 16p formed on the corner part 17. Next, ten or more cross section photo images are taken which are different cross sections along Y-axis direction. Then, a pore ratio per unit area is calculated regarding each of the obtained cross section photo images. Further, the average of the obtained pore ratios per unit area S is calculated, and the obtained average is defined as the pore ratio of the insulation layer 16p. In order to calculate a pore ratio, an SEM image of the cross section is obtained, and for example within a range of the unit area S=5×3.5 μm, a total area of voids which appear in black color due to absence of dielectric particles is auto-calculated. Then, the total area of voids is divided by the unit area S. The obtained value expressed in percentile (%) is the pore ratio.

Also, the pore ratio of the insulation layer 16a at the center position in X-axis direction of the multilayer body 4 can be obtained as similar to mentioned in above. Also, the pore ratio of the insulation layer 16b at the center position in Z-axis direction of the multilayer body 4 can be obtained as similar to mentioned in above.

In the present embodiment, when the difference between the pore ratio of the insulation layer 16p on the corner part 17 and the pore ratio of the insulation layer 16a is within ±5% or less, it is considered "substantially the same". Also, the same applies to the difference between the pore ratio of the insulation layer 16p on the corner part 17 and the pore ratio of the insulation layer 16b.

In the present embodiment, the pore ratio of the insulation layer 16p on the corner part 17 is preferably within a range of 0 to 10%. Also, the pore ratio of the insulation layer 16p on the corner part 17 is preferably smaller by 0 to 5% or so when compared to the pore ratio measured at a predetermined position (for example the center position in X-axis direction) of the dielectric layer 10.

In the present embodiment, the insulation layer 16a and the insulation layer 16b are smoothly connected in a continuous manner at the corner part 17, and the insulation layer 16a and the insulation layer 16b have virtually no space in between; and the insulation layer 16a and the insulation layer 16b have no boundary.

In the present embodiment, the pore ratio at the predetermined depth d from the surface of each of the insulation layers 16a to 16d can be obtained as similar to mentioned in above, and the pore ratios of these can be substantially the same. Also, the particle sizes (such as the average particle size in the unit area) of the dielectric particles at the predetermined depth d from the surface of each of the insulation layers 16a to 16d and 16p can be obtained as similar to mentioned in above, and in the present embodiment, these particle sizes of the insulation layers 16a to 16d and 16p are substantially the same as well.

In the present embodiment, the average particle size of the dielectric particles of the insulation layer 16p on the corner part 17 is preferably within the range of 150 to 350 μm.

In the present embodiment, the thicknesses of the insulation layers 16a to 16d and 16p are each within a range of 3 μm to 40 μm, and these thicknesses can be uniform. By doing so, an impact of a thermal expansion modulus on an insulation layer can be made small, and a structural defect caused by the difference between the thermal expansion moduli of the multilayer body 4 and the insulation layer can be suppressed. Also, in the present embodiment, the insulation layers 16b and 16d each function as a side-gap insulation layer, and the exposed ends in X-axis direction of the internal electrode layers 12 can be covered by the insulation layers 16b and 16d, thus exhibits a sufficient protection function. Also, in the present embodiment, a thickness variation within each of the insulation layers 16a to 16d and 16p is small.

Note that, in the present embodiment, the outer circumference face of the insulation layer 16p on the corner part 17 may not be curved. For example, as shown in FIG. 2Ab, when the corner part 17 of the multilayer body 4 is chamfered, the outer circumference face of the insulation layer 16p forms a flat surface shape along the chamfered face of the multilayer body 4. In this case, P1 is positioned on the outer circumference face of the insulation layer 16p which is a flat surface along the chamfered face. Further, in another embodiment of the present embodiment, the corner part 17 may not substantially have the curved part or the chamfered part, and in such case, P0 and P1 become extremely close to each other.

As shown in FIG. 1, the insulation layers 16a and 16c (same applies to the insulation layers 16b and 16d which are not shown in FIG. 1/hereinafter omitted) preferably do not substantially cover the end faces 5e and 5f which are positioned at both ends in Y-axis direction of the multilayer body 4. That is, the insulation layers 16a and 16c preferably do not cover the connecting ends of the lead parts 12α and 12β of the internal electrode layers 12 exposed at the end faces 5e and 5f positioned at both ends in Y-axis direction of the multilayer body 4. This is because, at the end faces 5e and 5f positioned at both ends in Y-axis direction of the multilayer body 4, the terminal electrodes 6 and 8 need to be formed so that these can connect with the lead parts 12α and 12β of the internal electrode layers 12.

The insulation layers 16a to 16d (includes 16p/same applies hereinbelow) of the present embodiment are constituted by the dielectrics having substantially the same or different compositions as the dielectric layers 10 and 11 of the multilayer body 4. The dielectrics having substantially the same compositions means that, for example, a dielectric main component in the dielectric layers 10 and 11 of the element body 4 is the same as a dielectric main component in the insulation layers 16a to 16d. For example, the dielectric main component of the insulation layers 16a to 16d may be a dielectric material having a perovskite structure such as $ABO_3$ or an alkali niobate-based ceramic as a main component.

Preferably, the insulation layers 16a to 16d include a larger amount of a component which improves sinterability compared to an amount included in dielectric layers 10 and 11 of the element body 4.

The compositions of the dielectric layers 10 and 11 are determined from the point which can be simultaneously fired with the internal electrode layer 12 while improving necessary properties for the electronic component such as a permittivity and so on. Also, the compositions of the insulation layers 16a to 16d are determined so that the insulation layers can be simultaneous fired with the internal electrode layer 12, the composition of the dielectric layers 10 and 11 is not influenced by the compositions of the insulation layers, and also enables to attain a better sinterability than the dielectric layers 10 and 11. From such point of view, as preferable components which are included in a larger amount in the insulation layers 16a to 16d than in the dielectric layers 10 and 11, boron, lithium, silicon (Si), manganese, magnesium, and the like may be mentioned.

For example, the insulation layers 16a to 16d include about 0.5 to 5 mol more of the components such as boron and the like compared to the amount included in dielectric layers 10 and 11. Thereby, the insulation layers 16a to 16d are sintered at lower temperature than the dielectric layers 10 and 11, and a sintered density is improved; thus, an effect of preventing the water intrusion can be further enhanced.

Also, in the present embodiment, since the main component of the insulation layers 16a to 16d is the dielectrics, the insulation layers are sintered at a low temperature, and the sintered density is improved, hence the effect of preventing the water intrusion can be further enhanced.

Figure 2B:
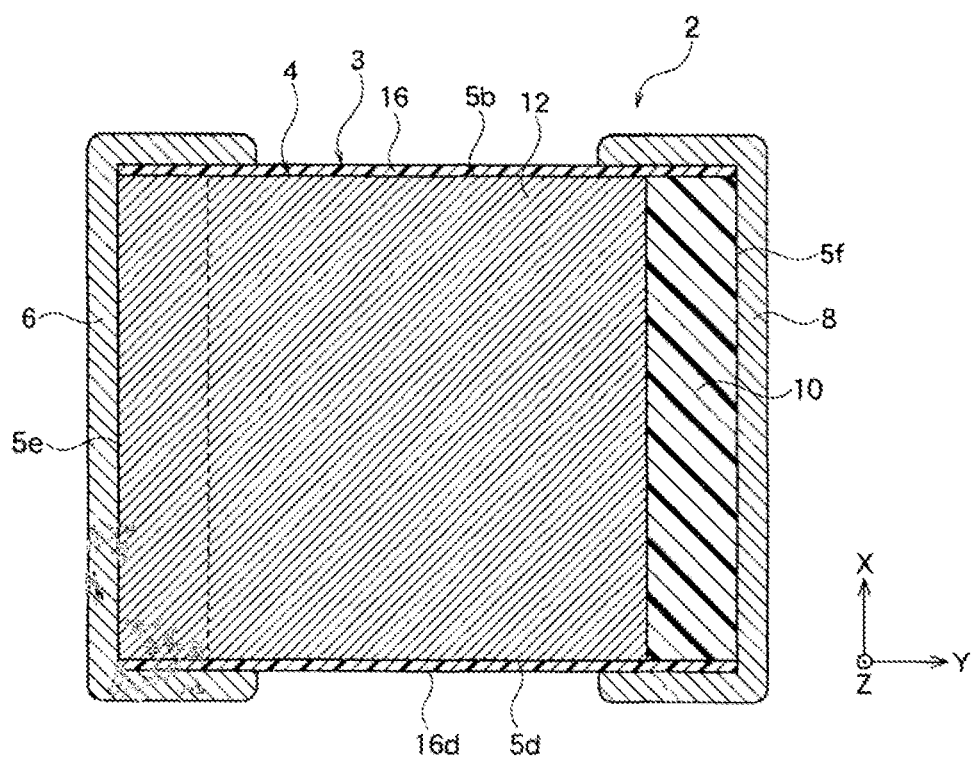
FIG. 2B shows a cross section along IIB-IIB line indicated in FIG. 1.

In the present embodiment, as shown in FIG. 1, both ends of the terminal electrodes 6 and 8 in Z-axis direction are formed so as to cover both ends in Y-axis direction of the insulation layers 16a and 16c. Also, as shown in FIG. 2B, both ends of the terminal electrodes 6 and 8 in X-axis direction are formed so as to cover both ends in Y-axis direction of the insulation layers 16b and 16d.

By constituting as such, at the end faces 5e and 5f of the multilayer body 4, the terminal electrodes 6 and 8 can completely cover the end parts of the boundaries between the insulation layers 16a to 16d and the multilayer body 4. Thus, a durability and the moisture resistance can be improved.

Thicknesses of the terminal electrodes 6 and 8 can be determined according to the purpose of use.

The terminal electrodes 6 and 8 of the present embodiment include a baking layer which is not shown in the figures and also is in contact with the element 3, and a plating layer which is not shown in the figure and placed on the baking layer. As the baking layer, Cu metal, Ni metal, and the like may be used. This baking layer is formed so to cover the end face 5e and part of the insulation layers 16a, 16b, 16c, and 16d. Also, as the plating layer, a Ni plating, a Cu plating, a Sn plating, and the like may be mentioned. The present embodiment has a terminal electrode structure wherein a Ni plating layer is formed on a Cu baking layer, and a Sn plating layer is formed on the Ni plating layer.

(Production Method of Multilayer Ceramic Capacitor)

Next, a method of producing a multilayer ceramic capacitor 2 as one embodiment of the present disclosure is described in detail.

(Production Steps of Multilayer Body)

First, the method of producing the multilayer body 4 which becomes the element body is described. An inner-green sheet 10a shown in FIG. 4A which constitutes the inner-dielectric layer 10 shown in FIG. 1 after firing, and an outer-green sheet 11a shown in FIG. 4A which constitutes the exterior area 11 shown in FIG. 1 are prepared.

In order to form these green sheets 10a and 11a, first, an inner-green sheet paste and an outer-green sheet paste are prepared. The inner-green sheet paste and the outer-green sheet paste are usually constituted by a water-based paste or an organic solvent-based paste which is obtained by kneading a ceramic powder and an organic vehicle.

Regarding raw materials of the ceramic powder, various compounds which become oxides or composite oxides, such as carbonates, nitrates, hydroxides, organometal compounds, and the like can be selected appropriately and mixed to be used as the raw materials of the ceramic powder. In the present embodiment, the raw materials of the ceramic powder are used in a form of powder having an average particle size within a range of 0.45 μm or less, and preferably within a range of 0.05 to 0.3 μm or so. Note that, in order to make the inner-green sheet, preferably the powder smaller than a thickness of the green sheet is used.

Figure 4A:
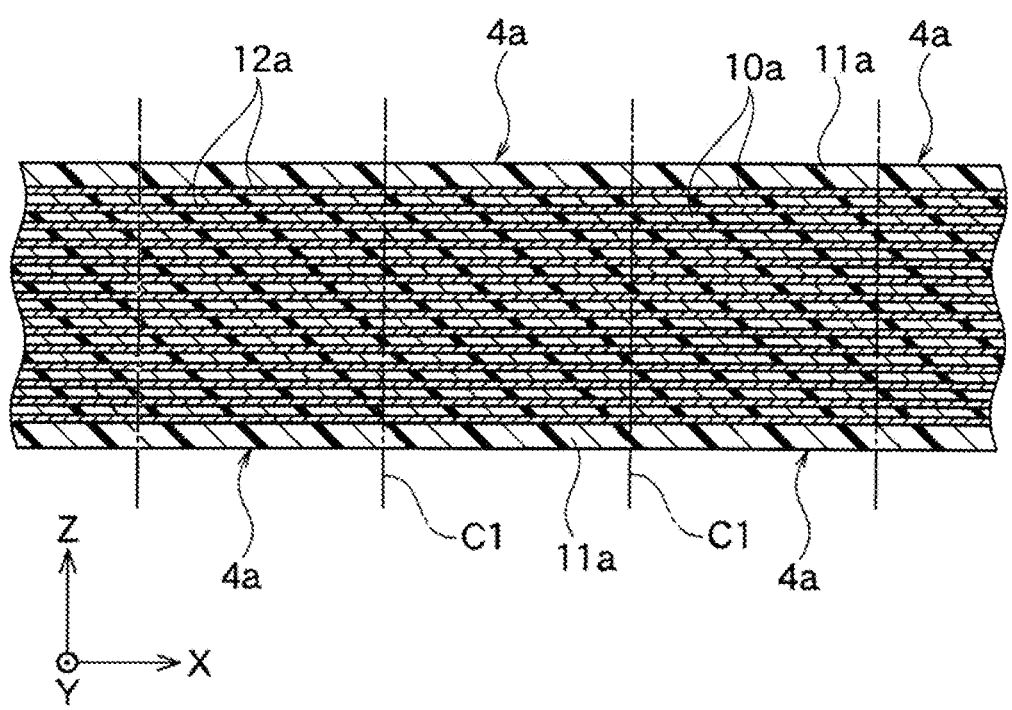
FIG. 4A shows a schematic cross section parallel to X-axis and Z-axis shows a stacking step of the green sheets during a production of the multilayer ceramic capacitor shown in FIG. 1.

Next, the internal electrode pattern layer 12a shown in FIG. 4A is formed which constitutes the internal electrode layer 12 shown in FIG. 1 after firing. In order to do so, the internal electrode layer paste is prepared. The internal electrode layer paste is prepared by kneading a conductive material made of the above-mentioned various conductive metals and alloys with the above-mentioned organic vehicle. A metal paste (terminal electrode paste) which constitutes the terminal electrodes 6 and 8 shown in FIG. 1 after firing may be prepared in the same manner as the above-mentioned internal electrode layer paste.

Figure 4B:
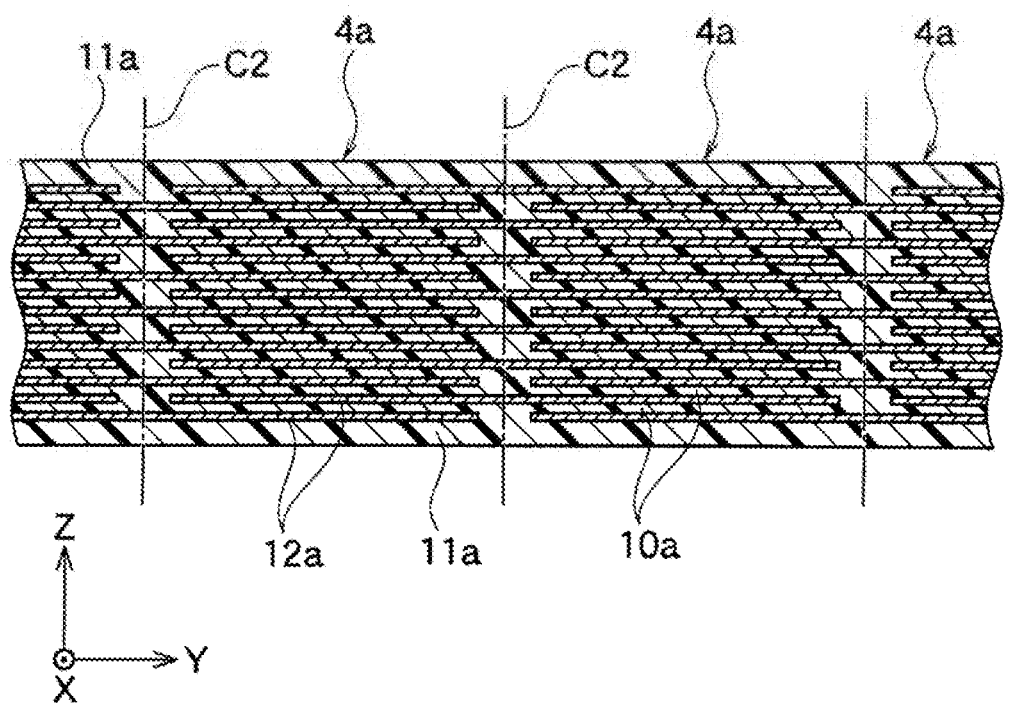
FIG. 4B shows a schematic cross section parallel to Y-axis and Z-axis, and shows the stacking step of the green sheets shown in FIG. 4A.

Using the inner-green sheet paste and the internal electrode layer paste prepared as mentioned in above, the inner-green sheet 10a and the internal electrode pattern layer 12a are staked in an alternating manner as shown in FIG. 4A and FIG. 4B. Thereby, an internal multilayer body is produced. Then, after the internal multilayer body is produced, the outer-green sheet 11a is formed using the outer-green sheet paste, and pressure is applied in a stacking direction to obtain a green multilayer body.

Note that, other than mentioned in above, as a method of producing the green multilayer body, predetermined numbers of the inner-green sheets 10a and internal electrode pattern layers 12a may be stacked in an alternating manner directly on the outer-green sheet 11a, then pressure may be applied in stacking direction to obtain the green multilayer body.

Next, the green multilayer body is cut along a C1 cutting plane and a C2 cutting plane shown in FIG. 4A and FIG. 4B, thereby a green chip 4a is obtained. The C1 cutting plane is a plane which is parallel to Y-Z axis plane, and the C2 cutting plane is a plane which is parallel to Z-X axis plane.

As shown in FIG. 4B, a discontinuous part of an internal electrode pattern layer 12a is cut at two C2 cutting planes which are adjacent to a C2 cutting plane cutting an internal electrode pattern layer 12a at the $n^{th}$ layer. Also, the C2 cutting plane which cuts the internal electrode pattern layer 12a at the $n^{th}$ layer cuts a discontinuous part of the internal electrode pattern layer 12a at the $n+1^{th}$ layer.

Figure 5A:
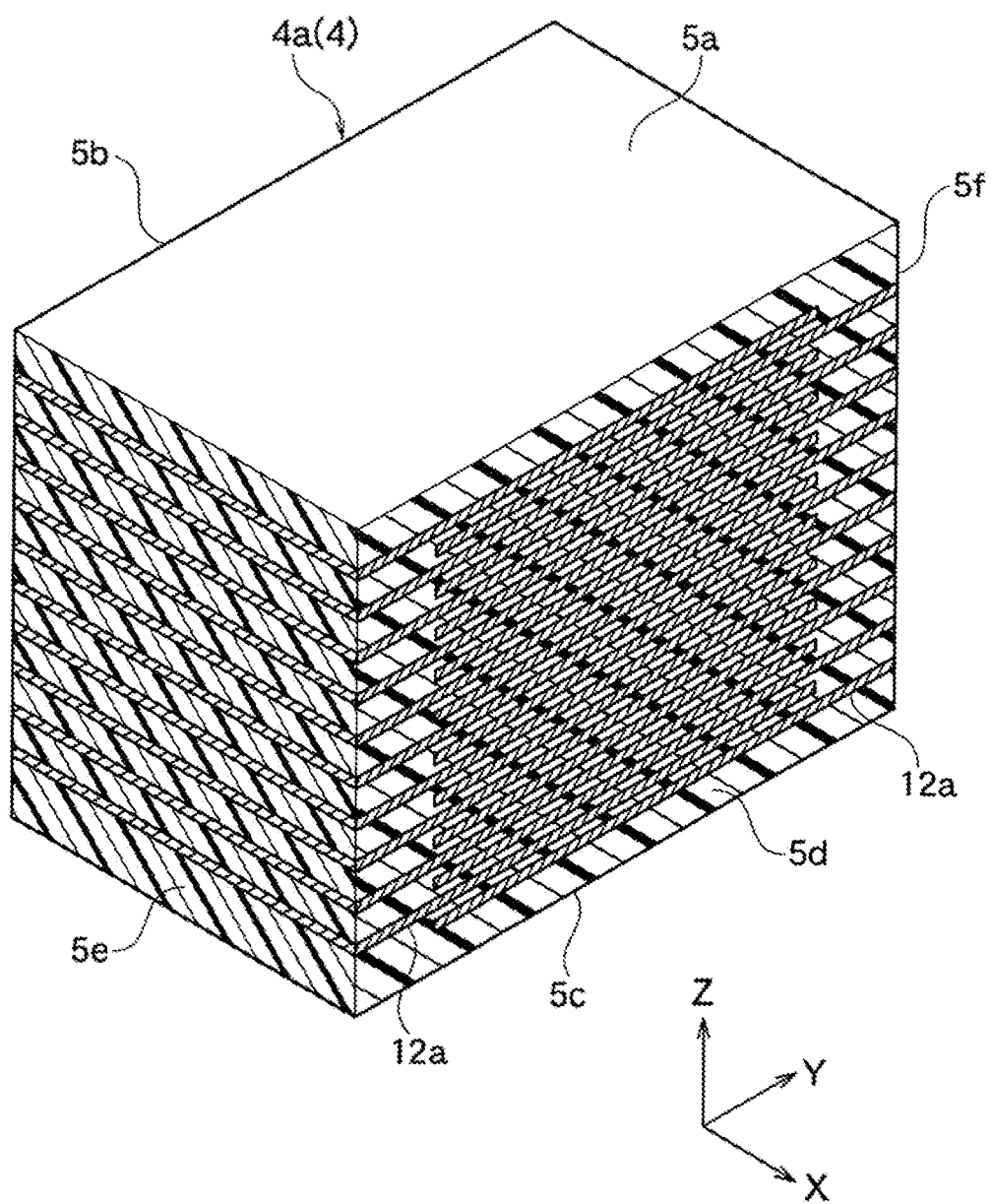
FIG. 5A is a schematic perspective view of a multilayer body after a cutting step which is performed following the stacking step shown in FIG. 4A and FIG. 4B.

By obtaining the green chip 4a shown in FIG. 5A using the above-mentioned cutting method, the internal electrode pattern layer 12a at the $n^{th}$ layer of the green chip 4a is exposed at one end face 5e in Y-axis direction of the green chip 4a but is not exposed at other end face 5f. On the other hand, the internal electrode pattern layer 12a at the $n+1^{th}$ layer of the green chip 4a is not exposed at one end face 5e in Y-axis direction but is exposed at the other end face 5f.

Further, at the C1 cutting planes of the green chip 4a shown in FIG. 4A, that is, at the side faces 5b and 5d facing against each other in X-axis direction of the green chip 4a shown in FIG. 5A, all of the internal electrode pattern layers 12a are exposed. Note that, a method of forming the internal electrode pattern layer 12a is not particularly limited, and it may be formed using a printing method, a transfer method, a thin film forming method such as deposition, spattering, and so on.

The green chip 4a is solidified after a plasticizer is removed by solid drying. By performing a binder removing step and a firing step to the dried green chip 4a, and also by performing an annealing step which is performed if needed, the multilayer body 4 before the insulation layers 16a to 16d are formed as shown in FIG. 2A is obtained. Also, the terminal electrodes 6 and 8 shown in FIG. 1 are not formed to this multilayer body 4. The perspective diagram of the multilayer body 4, which is prior to forming the insulation layer and the terminal electrode, is formed the same as the perspective diagram of the green chip 4a shown in FIG. 5A.

In the present embodiment, during the binder removing step, a holding temperature may for example be within a range of 200° C. to 400° C. The firing step is performed for example under reducing atmosphere; and the annealing step may be performed under neutral atmosphere or weakly oxidizing atmosphere. As other firing conditions and annealing conditions, for example, a holding temperature during the firing step is within a range of 1000° C. to 1300° C., and a holding temperature during the annealing step is within a range of 500° C. to 1100° C. The binder removing step, the firing step, and the annealing step may be performed continuously or these steps may be performed independently.

Note that, in the above-mentioned embodiment, the green multilayer body shown in FIG. 4A and FIG. 4B is diced and forms a green chip 4a, then the green chip 4a is fired to form the multilayer body 4. However, the multilayer body 4 shown in FIG. 4A and FIG. 4B may be fired to form a sintered body, then the sintered body may be cut to individual multilayer body 4.

Corners of the multilayer body 4 obtained as mentioned in above are chamfered using barrel and the like, thereby a curved face shown in FIG. 2Aa or a chamfered face shown in FIG. 2Ab may be formed. Also, end faces 5e and 5f of the multilayer body 4 is polished for example by barrel polishing, sand blast, and the like depending on needs.

(Step of Forming Insulation Layer)

Next, the step of forming the insulation layer on an outer circumference of the multilayer body 4 which becomes the element body is described. Note that, in the above description of the production step of the multilayer body 4, the multilayer body 4 is fired before the insulation layers 16a to 16d are formed. However, in the present embodiment, preferably the dielectric sheet 24, which becomes the insulation layers 16a to 16d, is wrapped to the multilayer body 4 prior to the firing step, then firing may be performed. Hereinbelow, the method of forming the insulation layer is described in detail.

Figure 6A:
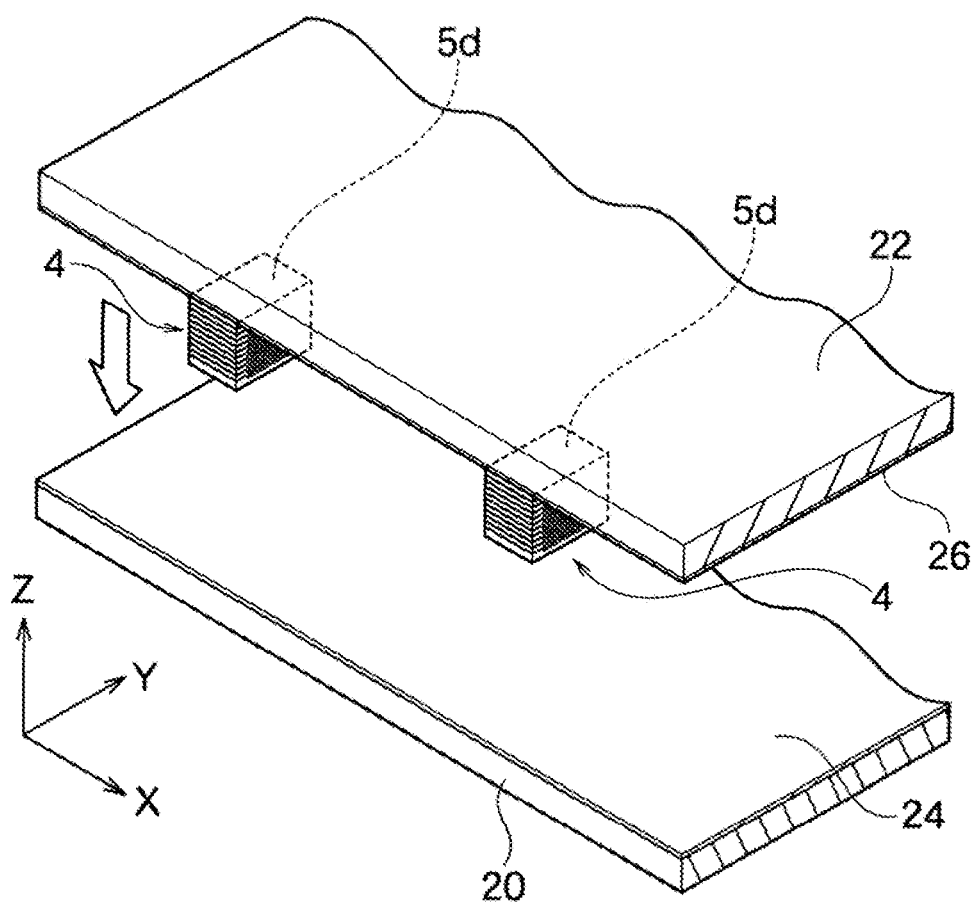
FIG. 6A is a schematic perspective view showing production steps of the multilayer ceramic capacitor of the present disclosure.
Figure 6B:
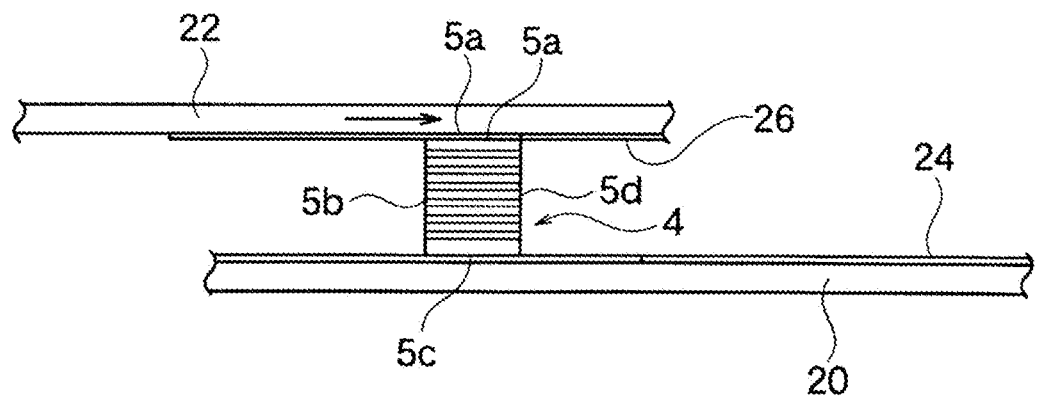
FIG. 6B is a schematic perspective view showing a subsequent step after the step shown in FIG. 6A.

As shown in FIG. 6A, a wrapping dielectric sheet 24 is placed on upper face of a first rolling member 20, and an adhesive sheet 26 is provided on a lower face of a second rolling member 22. As shown in FIG. 6B, a single multilayer body 4 or a plurality of multilayer bodies 4 is placed between the first rolling member 20 and the second rolling member 22. In the present embodiment, first, the side face 5a of the multilayer body 4 is adhered to the adhesive sheet 26, and an adhesive film 26a is formed. Note that, in FIG. 6A, the multilayer body 4 appears to be adhered on the adhesive sheet 26 at the lower face of the second rolling member 22, however the multilayer body 4 does not necessarily have to be in such way, and first it may be simply placed only on the dielectric sheet 24 of the first rolling member 20.

The first rolling member 20 and the second rolling member 22 may be made of the same material or these may be formed of different materials. As the first rolling member 20 and the second rolling member 22, for example, a board form member or a sheet form member having some level of rigidity may be used. The materials of the first rolling member 20 and the second rolling member 22 are not particularly limited, and metals, ceramics, plastics, and the like may be used.

The wrapping dielectric sheet 24 is not particularly limited as long as it is a sheet which becomes the insulation layers 16a to 16d shown in FIG. 2A after the heat treatment. For example, a dielectric sheet of which the main component is substantially the same or different material as the dielectric green sheet for forming the dielectric layer 10 or 11 shown in FIG. 1A may be mentioned. Also, other than this, a semi-cured dielectric sheet and the like may be mentioned.

For example, the dielectric sheet 24 preferably includes substantially the same dielectric materials compared to the dielectric green sheet 10a shown in FIGS. 4A and 4B. However, the dielectric materials included in the dielectric sheet 24 may be different from that included in the dielectric green sheet 10a. When the insulation layer and the dielectric green sheet are made using substantially the same compositions, the multilayer body and the insulation layers can be fired together. Also, regarding subcomponents of the dielectric materials, preferably components which can improve sinterability such as boron and the like may be preferably included in a large amount.

Also, regarding a binder and a plasticizer, the dielectric sheet 24 includes 1 to 10% more of the total of binder and plasticizer compared to those included in the dielectric green sheet 10a shown in FIG. 4A and FIG. 4B. The dielectric sheet 24 is provided on the surface of the first rolling member 20 in a releasable manner but in a way which does not move in sideways.

Also, the adhesive sheet 26 is provided to the lower face of the second rolling member 22 in a releasable manner but in a way which does not move in sideways. The adhesive sheet 26, for example, may be a double-sided adhesive sheet, and preferably adhesiveness to the multilayer body 4 is preferably stronger than adhesiveness to the lower face of the second rolling member 22. The adhesive sheet 26 is for example constituted by synthetic polymers such as acryl, polyvinyl butyral, polyvinyl alcohol, polyvinyl acetate, epoxy, and the like; and natural polymers such as rosin, terpene, and the like.

As shown in FIG. 6B, the second rolling member 22 is lowered towards the first rolling member 20, thereby the multilayer body 4 is pressed against the first rolling member 20 using the second rolling member 22. As a result, part of the adhesive sheet 26 is transferred to the side face 5a of the multilayer body 4 and forms an adhesive film 26a. Next, as shown in FIG. 6C, the multilayer body 4 is pressed against the first rolling member 20 using the second rolling member 22 (this may be the other way around, that is the multilayer body 4 may be pressed against the second rolling member 22 using the first rolling member 20, and the same applies in below), and while pressing the multilayer body 4, the second rolling member 22 is moved in a direction parallel with the first rolling member 20 (in the direction indicated by an arrow).

By moving the second rolling member 22 in relative to the first rolling member 20, the multilayer body 4 can roll in a circumference direction of the side faces 5a to 5d on the first rolling member 20 (or on the second rolling member 22). Note that, when the multilayer body 4 is rolled, the relative distance between the first rolling member 20 and the second rolling member 22 may change together with a change of rotating radius of the multilayer body 4 while it is rolled. That is, the multilayer body 4 is preferably always in contact with both the first rolling member and the second rolling member while the multilayer body 4 is being rolled.

Figure 6C:
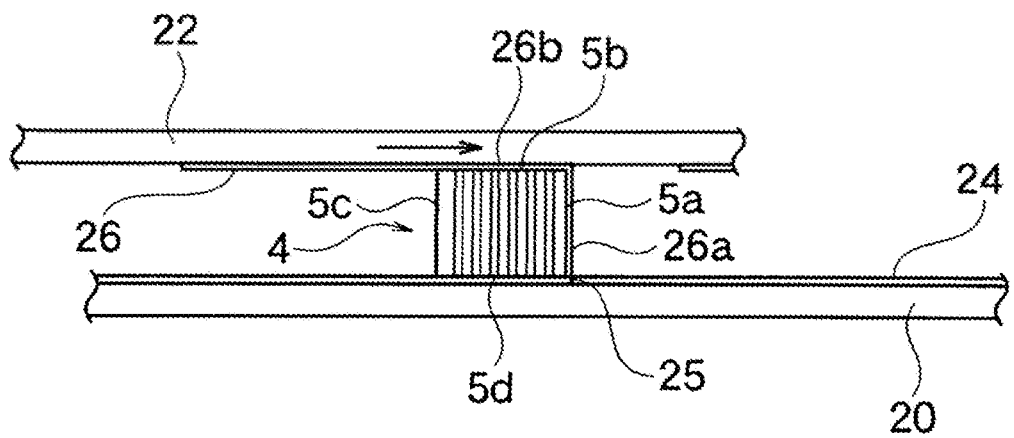
FIG. 6C is a schematic perspective view showing a subsequent step after the step shown in FIG. 6B.

As shown in FIG. 6C, as the multilayer body 4 rolls, the adhesive film 26a formed to the side face 5a of the multilayer body 4 is released from the lower face of the second rolling member 22 and the adhesive film 26a is transferred to the side face 5a. Also, at the same time, the adhesive sheet 26 is adhered to the side face 5b of the multilayer body 4, and forms the adhesive film 26b. Note that, a slit 25 may be formed to the wrapping dielectric sheet 24, and a position of the slit 25 preferably matches the rolling start position of the side face 5a of the multilayer body 4 on the surface of the first rolling member 20.

Figure 6D:
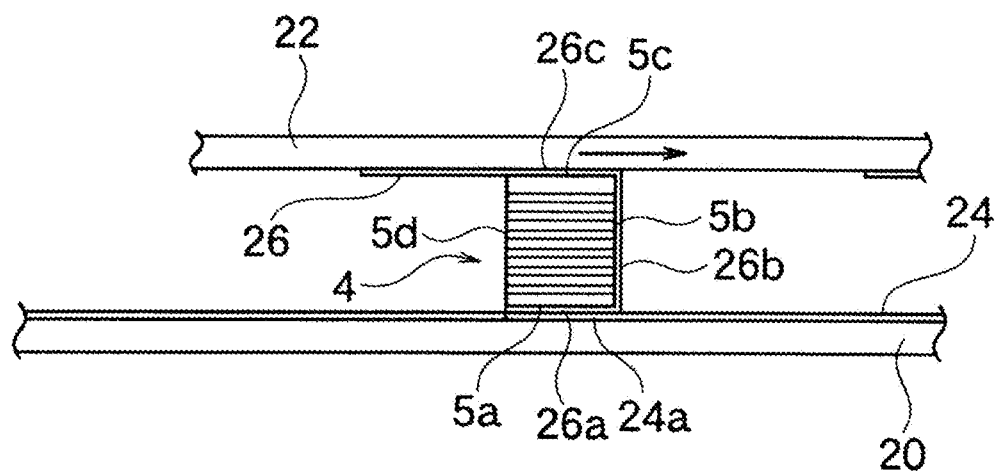
FIG. 6D is a schematic perspective view showing a subsequent step after the step shown in FIG. 6C.

Further, as the second rolling member 22 is moved in the same direction (in the direction indicated by the arrow), the multilayer body 4 rolls as shown in FIG. 6D, and the adhesive film 26a formed on the side face 5a of the multilayer body 4 adheres to the wrapping dielectric sheet 24, and the outer circumference film 24a which becomes the insulation layer 16a is formed. Also, the adhesive sheet 26 is adhered to the side face 5c of the multilayer body 4, and the adhesive film 26c is formed.

Figure 6E:
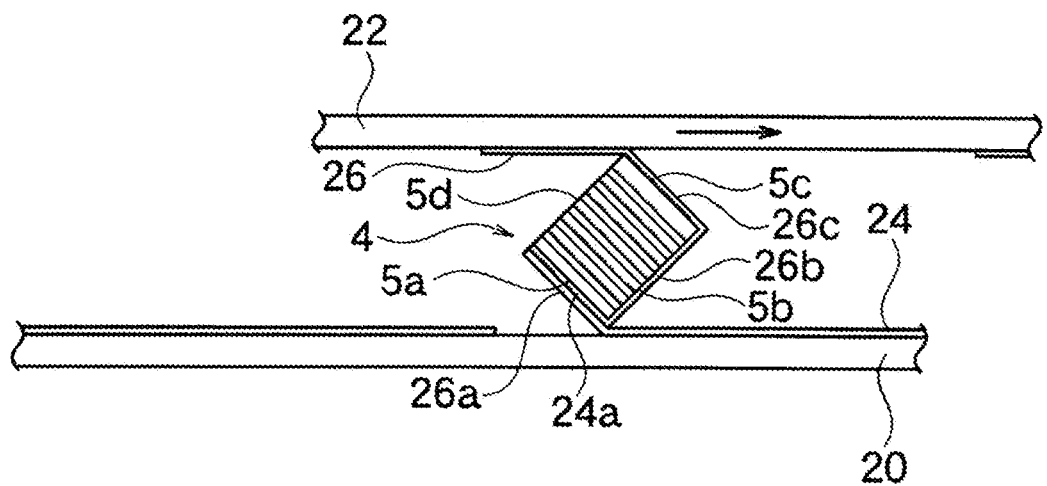
FIG. 6E is a schematic perspective view showing a subsequent step after the step shown in FIG. 6D.

Further, when the second rolling member 22 is kept moving in the same direction (in the direction indicated by the arrow), as shown in FIG. 6E, due to the slit 25, the wrapping dielectric sheet 24 is disconnected from the wrapping dielectric sheet 24 positioned on the surface of the first rolling member 20, and it is transferred to the side face 5*a* of the multilayer body 4, thereby the outer circumference film 24*a* is formed. Note that, if the outer circumference film 24*a* can be transferred to the side face 5*a* of the multilayer body 4, the slit 25 of the wrapping dielectric sheet 24 is not necessarily needed.

Figure 6F:
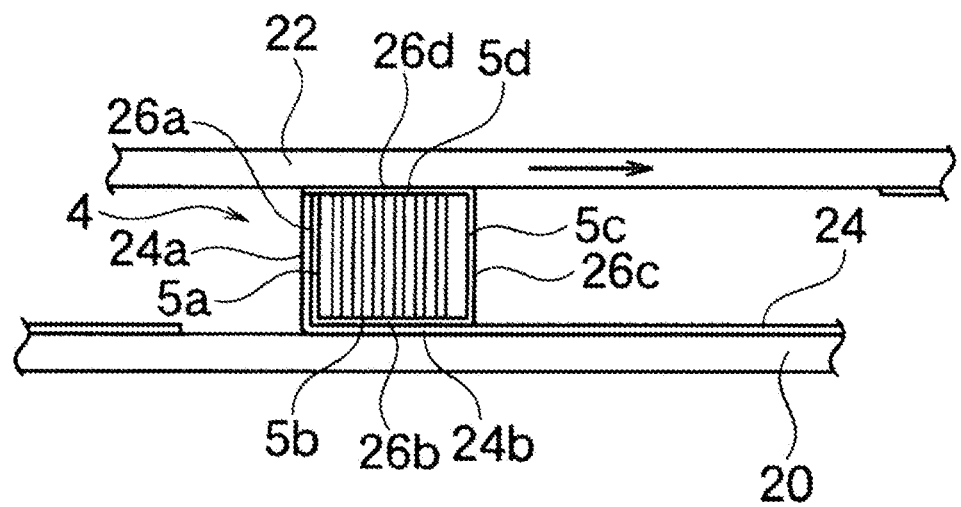
FIG. 6F is a schematic perspective view showing a subsequent step after the step shown in FIG. 6E.

Further, when the second rolling member 22 is moved in the same direction, as shown in FIG. 6F, the adhesive film 26*b* formed on the side face 5*b* of the multilayer body 4 adheres to the wrapping dielectric sheet 24, and the outer circumference film 24*b* which becomes the insulation layer is formed. Also, the adhesive sheet 26 adheres to the side face 5*d* of the multilayer body 4, and the adhesive film 26*d* is formed.

Figure 6G:
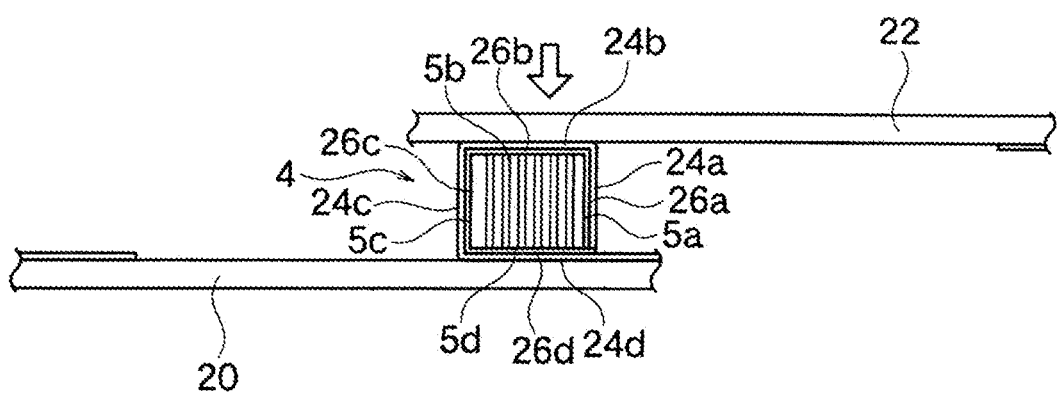
FIG. 6G is a schematic perspective view showing a subsequent step after the step shown in FIG. 6F.

Similarly, by moving the second rolling member 22 in the same direction to roll the multilayer body 4, as shown in FIG. 6G, the wrapping dielectric sheet 24 adheres to an adhesive film 26*c* of the side face 5*c* of the multilayer body 4, and the outer circumference film 24*c* which becomes an insulation layer is formed. Further, the wrapping dielectric sheet 24 adheres to an adhesive film 26*d* of the side face 5*d* of the multilayer body 4, and the outer circumference film 24*d* which becomes an insulation layer is formed.

Figure 6H:
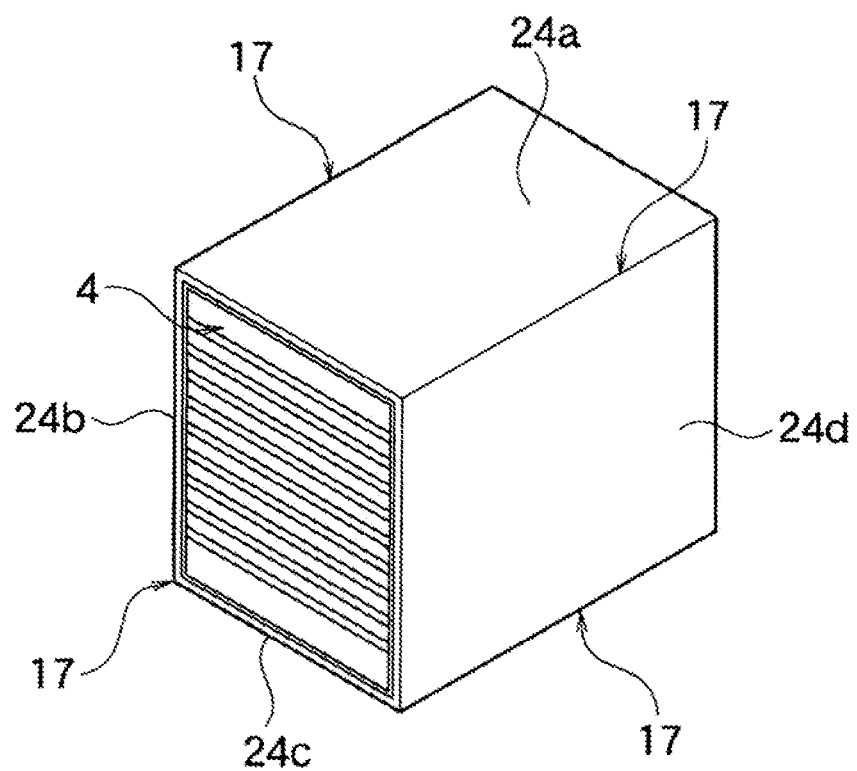
FIG. 6H is a schematic perspective view of a multilayer body which has been released from a sheet after the step shown in FIG. 6G.

Further, by pressing the multilayer body 4 towards the first rolling member 20 from an upper part of the second rolling member 22 to which the multilayer body 4 is adhered, the outer circumference film 24*d* can be disconnected from the dielectric sheet 24 provided on the first rolling member 20. By doing so, an end part of the outer circumference film 24*a* and an end part of the outer circumference film 24*d* are connected, and as shown in FIG. 6H, the multilayer body 4 to which the outer circumference films 24*a* to 24*d* are wrapped around can be obtained.

Next, if needed, drying and binder removal treatments are performed to the multilayer body 4 to which the outer circumference films 24*a* to 24*d* are wrapped around, and then a firing treatment is performed. Thereby, the multilayer body 4 formed with the insulation layers 16*a* to 16*d* shown in FIG. 2A is obtained.

Note that, if needed, the multilayer body 4 wrapped with the outer circumference films 24*a* to 24*d* may be further rolled between the first rolling member 20 and the second rolling member 22, thereby one or more layers of outer circumference films 24*a* to 24*d* may be further formed over the outer circumference films 24*a* to 24*d*. Also, prior to the baking treatment, if needed, the multilayer body 4 wrapped with the outer circumference films 24*a* to 24*d* may be deburred by a barrel treatment.

After forming the multilayer body 4 which has been formed with the insulation layers 16*a* to 16*d*, as shown in FIG. 1, the terminal electrodes 6 and 8 are formed respectively to the Y-axis end faces 5*e* and 5*f* of the multilayer body 4. In order to form the terminal electrodes 6 and 8, a metal paste is coated and baked to the both end faces in Y-axis direction of the multilayer body 4, thereby the metal paste baked film is formed which becomes the electrode film of the terminal electrodes 6 and 8. A method of forming the electrode film of the terminal electrodes 6 and 8 is not particularly limited, and any appropriate methods such as coating, baking, plating, deposition, spattering, and the like of the metal paste can be used.

Note that, when the metal phase is coated on the end faces in Y-axis direction of the multilayer body 4 by dipping, preferably the metal paste is coated so that it also spreads to the end faces in X-axis direction and Z-axis direction of the multilayer body 4. The width of spread in Y-axis direction is preferably 50 μm to 200 μm. The width of spread can be controlled by adjusting the viscosity of the metal paste and the dipping conditions of the metal paste. A baking temperature of the metal paste is preferably higher by 0° C. to 50° C. than the melting point (softening point) of glass included in the terminal electrodes 6 and 8.

A coating layer may be formed to the surface of the electrode film of the terminal electrodes 6 and 8 by plating, a spattering treatment, and the like. The terminal electrodes 6 and 8 are formed after the insulation layers 16*a* to 16*d* are formed.

SUMMARY OF EMBODIMENT

In the present embodiment, a thickness of the adhesive sheet 26 shown in FIG. 6A to FIG. 6G is within a range of 0.3 μm to 4 μm, and it is preferably ⅕ to ¹⁄₂₀ or so of the thickness of the dielectric sheet 24. The adhesive sheet 26 having a such thickness is so thin that the end part of the outer circumference film 24*a* and the end part of the outer circumference film 24*d* which are constituted by the dielectric sheet 24 are bonded, which allows the outer circumference films 24*a* to 24*d* to wrap around the multilayer body in a continuous manner without being interfered by the adhesive sheet 26 as shown in FIG. 6G. Therefore, no discontinuous part is formed between the insulation layer 16*a* and the insulation layer 16*d*, hence a starting point of crack is suppressed from forming.

As mentioned in above, the method of producing the multilayer ceramic capacitor 2 according to the present embodiment, for example, includes a step of rolling the side faces 5*a* to 5*d* of the multilayer body 4 in a way that the side faces 5*a* to 5*d* contact with the dielectric sheet 24 one after another continuously on the dielectric sheet 24 (transfer layer) having a uniform thickness, thereby adheres the outer circumference films 24*a* to 24*d* to the side faces of the multilayer body 4 in a continuous manner (rolling transfer method). Therefore, the multilayer ceramic capacitor 2 according to the present embodiment can be produced extremely easily.

The dielectric sheet 24 adheres, for example, to the side faces 5*a* to 5*d* of the multilayer body 4 prior to firing, and forms the insulation layers 16*a* to 16*d* after the baking treatment with the multilayer body 4, and part of these insulation layers forms the side-gap insulation layers. Also, in the present embodiment, since the side-gap insulation layers are formed using a rolling transfer method, unlike a coating method, an insulation layer is not formed to unnecessary parts. Therefore, the insulation layers 16*a* to 16*e* are substantially not formed at the end faces 5*e* and 5*f* of the multilayer body 4 formed with the terminal electrodes 6 and 8 are formed and connect with the internal electrode layer 12.

As a result, even when the multilayer body 4 as an element body is downsized, connection reliability between the terminal electrodes 6 and 8 with the internal electrode layer 12 is improved. Note that, "the insulation layers 16*a* to 16*e* are substantially not formed to the end faces 5*e* and 5*f* of the multilayer body 4" means that the insulation layers 16*a* to 16*e* are barely formed compared to a coating method.

The insulation layers 16*a* to 16*d* of the multilayer ceramic capacitor 2 of the present embodiment are one insulation layer covering the side faces 5*a* to 5*d* in a continuous manner along the circumference direction, hence these insulation layers have approximately uniform quality (consistent property) even at parts other than the side-gap insulation layers. Particularly, as shown in FIG. 2Aa and FIG. 2Ab, the corner part 17 formed between the side faces 5*a* and 5*b* of the multilayer body 4 has the insulation layer 16p having properties (for example, a pore ratio, particle sizes of the dielectric particle, and so on) which are also consistent with those of the insulation layers 16a to 16d. Unlike an edge of the insulation layer formed using a coating method, in the multilayer ceramic capacitor 2 of the present embodiment, the edge of the insulation layer does not necessarily have to be formed close to the corner part 17 of the multilayer body 4.

In a conventional multilayer ceramic capacitor, an edge of an insulation layer formed using a coating method needs to be positioned near the corner part 17 of the multilayer body 4 so that areas of the end faces 5e and 5f of the multilayer body 4 which become connecting end faces between the terminal electrodes 6 and 8 are not narrowed down. On the contrary to this, in the multilayer ceramic capacitor 2 of the present embodiment, the insulation layers 16a to 16d can be formed using a rolling transfer method, thus the insulation layer 16p having a uniform quality compared to other parts can be formed even at an area close to the corner part 17 of the multilayer body 4. Hence, unlike the conventional multilayer ceramic capacitor, the thin insulation layer is not formed around the corner part 17. Therefore, this can effectively prevent moisture from entering, hence the moisture resistance and the reliability of the multilayer ceramic capacitor 2 are improved.

Also, the insulation layers 16a to 16d (including 16p/ hereinafter the same applies) have a high density and excellent moisture resistance compared to ceramic layers made of the dielectric layers 10 and 11 and the like which focus on the dielectric property. Therefore, due to the insulation layers 16a to 16d, the exposed ends of the internal electrode layer 12 at the side faces of the multilayer body 4 can be protected, hence the reliability further improves.

Further, the insulation layers 16a to 16d cover all of the side faces 5a to 5d which are continuous along the circumference direction of the multilayer body 4. By constituting as such, a path to enter into the boundary between the insulation layers 16a to 16d and the multilayer body 4 can be blocked across the entire circumference of the side faces 5a to 5d of the multilayer body 4, thus the moisture resistance and the reliability of the multilayer ceramic capacitor 2 can be further improved.

Note that, the insulation layers 16a to 16d do not necessarily have to completely cover all of the side faces 5a to 5d continuous along the circumference direction of the multilayer body 4, and a discontinuous part may be formed on one side face among the side faces 5a to 5d. For example, the discontinuous part may be formed to the insulation layer 16a on the side face 5a. That is, at one side face (for example at the side face 5a) among the side faces 5a to 5d of the multilayer body 4, the edge of the insulation layer 16a is positioned along a perpendicular direction to the circumference direction at an area near the center area in X-axis direction of the side face 5a away from the corner part of the multilayer body 4. The insulation layers may be discontinuous at such position which may partially expose the side face 5a of the multilayer body 4.

In order to form such insulation layers around the side faces of the multilayer body 4, the dielectric sheet 24 is wrapped from the center area in X-axis direction at the side face 5a of the multilayer body 4, and wrapping may be ended around the center area in X-axis direction of the side face 5a of the same multilayer body 4.

In the present embodiment, the insulation layers 16a to 16d can have approximately uniform composition along the circumference direction. As the insulation layers 16a to 16d have approximately uniform composition, the moisture resistance is also uniform along the circumference direction, and the number of points which could lower the moisture resistance is decreased, thus the reliability of the multilayer ceramic capacitor 2 improves. Note that, by forming the insulation layers 16a to 16d using a rolling transfer method, the insulation layers 16a to 16d having a uniform composition along the circumference direction can be formed easily.

Also, in the present embodiment, the insulation layers 16a to 16d may be formed by performing the baking treatment after one or more layers of the dielectric sheets 24 are wrapped around, and the thicknesses of the insulation layers 16a to 16d may be within a range of 3 μm to 40 μm. Since the insulation layers 16a to 16d are formed from the dielectric sheet having a uniform thickness, the thicknesses of the insulation layers 16a to 16d are substantially the same along the circumference direction.

Note that, as mentioned in above, when the insulation layer 16b shown in FIG. 2Aa and the dielectric layer 11 are constituted by substantially the same materials, the boundary between the dielectric layer 11 and the insulation layer 16b is difficult to clearly measure from the cross-section photo image of the multilayer body 4. However, by measuring the pore ratio (or the particle size) at the predetermined depth from the surface of the insulation layer 16p on the corner part 17 and the pore ratios (the particle sizes) at the predetermined depth from the surface of the insulation layers 16a and 16b, and when these pore ratios (particle sizes) are substantially the same, then it can be considered that the thicknesses of the insulation layers 16a to 16b are substantially uniform along a circumference direction. Also, the thicknesses of the insulation layers 16a to 16d can be considered substantially uniform along the circumference direction using the same method mentioned in above.

By making the thicknesses of the insulation layers 16a to 16d uniform, the number of points which could lower the moisture resistance is decreased, thus the moisture resistance and the reliability of the multilayer ceramic capacitor 2 improve. The insulation layers 16a to 16d can be formed using a rolling transfer method, thus the insulation layers 16a to 16d having substantially the same thicknesses along the circumference direction are easily attained.

Further, in the present embodiment, as shown in FIG. 2Aa and FIG. 2Ab, the properties (such as the pore ratio, the particle sizes, and the like) of the insulation layer 16p on the corner part 17 of the multilayer body 4 can be substantially the same as the properties of at least one of the insulation layers 16a and 16b on the side faces among the side faces 5a and 5b of the multilayer body 4 connecting to the corner part 17. Particularly, by making the properties of the insulation layer 16p on the corner part 17 of the element body 3 formed with insulation layer the same as the properties of other parts, the moisture resistance of the multilayer ceramic capacitor 2 is improved and the reliability is also improved. The insulation layer 16p can be formed by a rolling transfer method, thus the properties of the insulation layer 16p on the corner part 17 of the element body 3 formed with insulation layer tends to easily be substantially the same as the properties of other parts.

In the present embodiment, the insulation layers 16a to 16d completely cover the outer circumference of the multilayer body 4, thus the end of the boundary between the insulation layers 16a to 16d and the multilayer body 4 can be completely blocked from outer air, thus the durability and the moisture resistance can be further improved.

Further, as shown in FIG. 1 and FIG. 2B, in the present embodiment, the end faces 5e and 5f of the multilayer body 4 are formed with the terminal electrodes 6 and 8; and the edges of the terminal electrodes 6 and 8 partially cover the insulation layers 16a to 16d positioned at the side faces 5a to 5d of the multilayer body 4. Therefore, at the end faces 5e and 5f of the multilayer body 4, the terminal electrodes 6 and 8 can cover the end of the boundary between the insulation layers 16a to 16d, thus the durability and the moisture resistance can be further improved.

In the present embodiment, the dielectric sheet wrapped around the pre-fired multilayer body 4 and fired together, thereby the insulation layer is formed to the multilayer body 4. By forming the insulation layer as mentioned in above, the moisture resistance of the electronic component is enhanced, the durability against the environmental change such as heat impact, physical impact, and the like can be improved.

The insulation layers 16a to 16d are formed of a one wrapping dielectric sheet 24, and each of these layers are continuous, hence the boundary between the insulation layers 16a to 16d and the multilayer body 4 is not exposed to outside. Therefore, moisture hardly enters into the boundary, and thus crack starting from the boundary can be effectively prevented.

Also, in the present embodiment, in the cross section of FIG. 2A, positions of the X-axis direction end of the internal electrode layers 10 of the multilayer body 4 can vary, for example, within a range of 5 μm.

Note that, in the present embodiment, sintering of the multilayer body 4 and baking of the outer circumference films 24a to 24d are preferably carried out at the same time, however, the outer circumference films 24a to 24d may be baked after the multilayer body 4 is sintered.

Second Embodiment

A method of forming an insulation layer to an outer circumference of the multilayer ceramic capacitor according to the present embodiment is different from that of the first embodiment. In below, common parts in the first embodiment and the second embodiment are not described, and the parts which are different from the first embodiment are mainly described. Hereinbelow, parts which are not described are the same as the first embodiment.

As shown in FIG. 7A to FIG. 7F, a step of forming the insulation layers 16a to 16d to the outer circumference of the side faces 5a to 5d of the multilayer body 4 during a method of producing the multilayer ceramic capacitor according to the present embodiment is different from the method of producing the multilayer ceramic capacitor according to first embodiment.

Figure 7A:
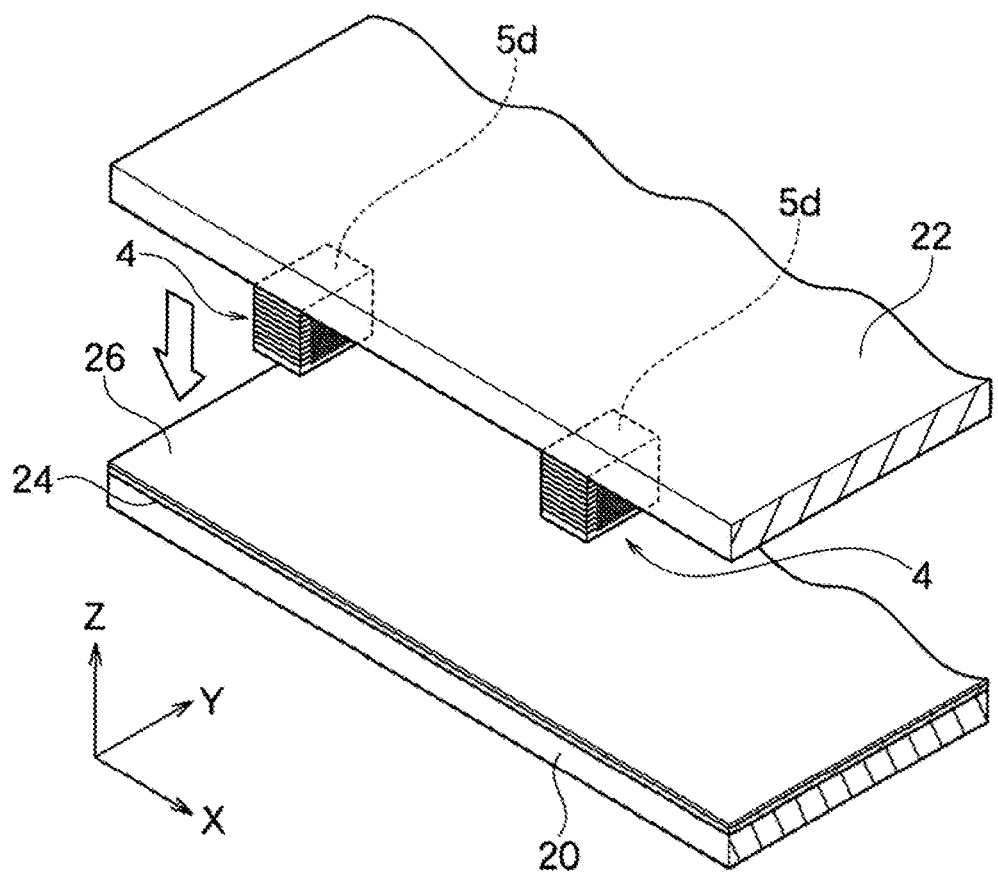
FIG. 7A is a schematic perspective view showing a step during the production of a multilayer ceramic capacitor according to a modified example of the present disclosure.

As shown in FIG. 7A, the wrapping dielectric sheet 24 is provided on the upper face of the first rolling member 20, and the adhesive sheet 26 is adhered on said wrapping dielectric sheet 24. Unlike the first embodiment, the present embodiment does not have the adhesive layer on the second rolling member 22, and the second rolling member itself may have an adhesive property.

The second rolling member 22 having the adhesive property is not particularly limited, and it may be a sheet that the surface of the sheet material becomes an adhesive face, for example, a foam sheet, a rubber sheet such as silicone, an acryl-based tape, an UV tape (a tape of which the adhesiveness weakens by UV irradiation), and the like may be mentioned. As a resin which constitutes the foam sheet, for example, urethane, acryl, silicone, polyester, polyurethane, and the like may be mentioned.

Figure 7B:
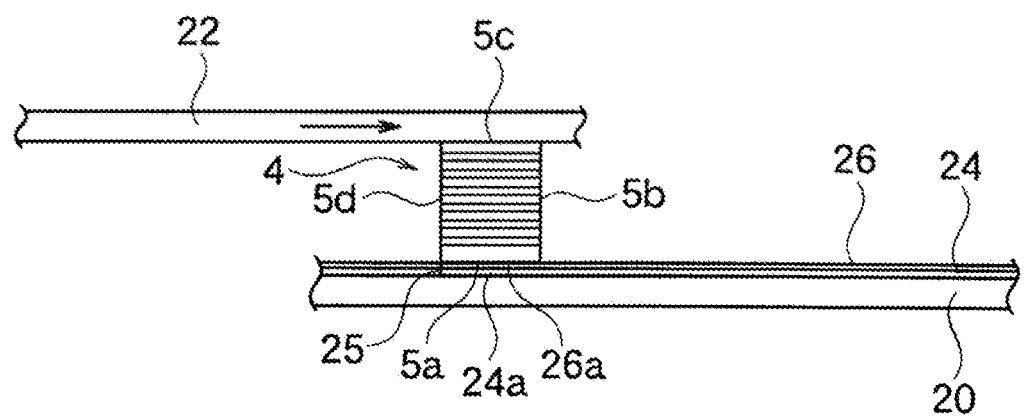
FIG. 7B is a schematic perspective view showing a subsequent step after the step shown in FIG. 7A.

As shown in FIG. 7B, the second rolling member 22 is lowered, and the multilayer body 4 is pressed to the first rolling member 20 using the second rolling member 22. The side face 5a of the multilayer body 4 adheres to the adhesive sheet 26, and the outer circumference film 24a made of the adhesive film 26a and the insulation layer 16a is formed. Also, the slit 25 may be formed to the wrapping dielectric sheet 24, and the position of the slit 25 matches the edge of the side face 5d of the multilayer body 4.

Figure 7C:
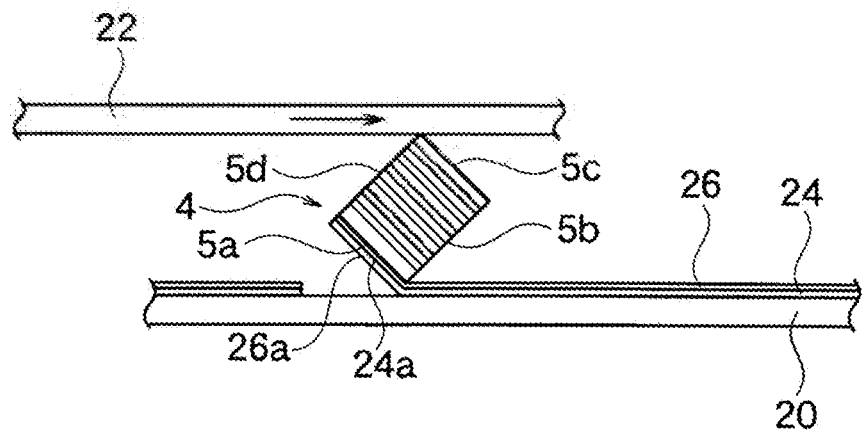
FIG. 7C is a schematic perspective view showing a subsequent step after the step shown in FIG. 7B.

As shown in FIG. 7C, while the multilayer body 4 is pressed against the first rolling member 20 using the second rolling member 22, the second rolling member 22 is moved in the direction indicated by the arrow as similar to the first embodiment, then the multilayer body 4 is rolled. Thereby, the outer circumference film 24a is separated from the wrapping dielectric sheet 24 due to the slit 25.

Figure 7D:
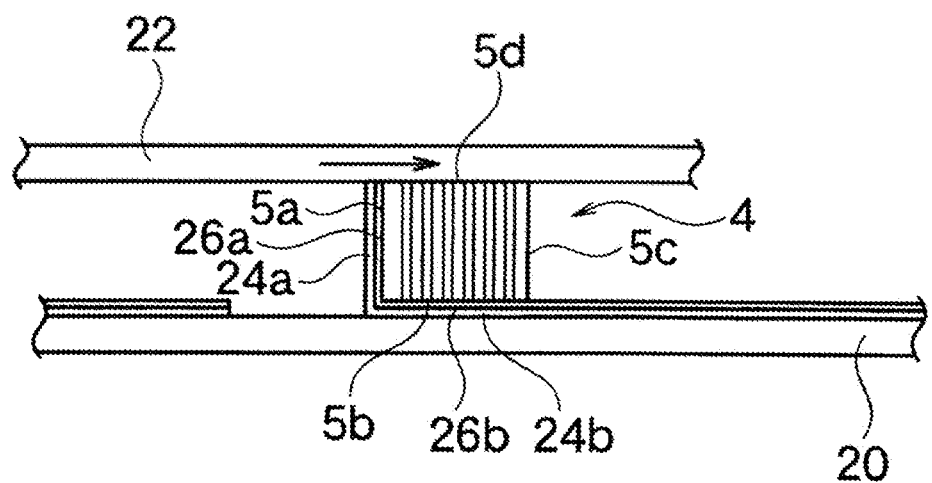
FIG. 7D is a schematic perspective view showing a subsequent step after the step shown in FIG. 7C.

Further, when the second rolling member 22 is moved to the same direction as mentioned in above, as shown in FIG. 7D, the multilayer body 4 is rolled, and the adhesive sheet 26 adheres to the side face 5b of the multilayer body together with the wrapping dielectric sheet 24. Thereby, the outer circumference film 24b which becomes the adhesive film 26b and the insulation layer 16b is formed.

Figure 7E:
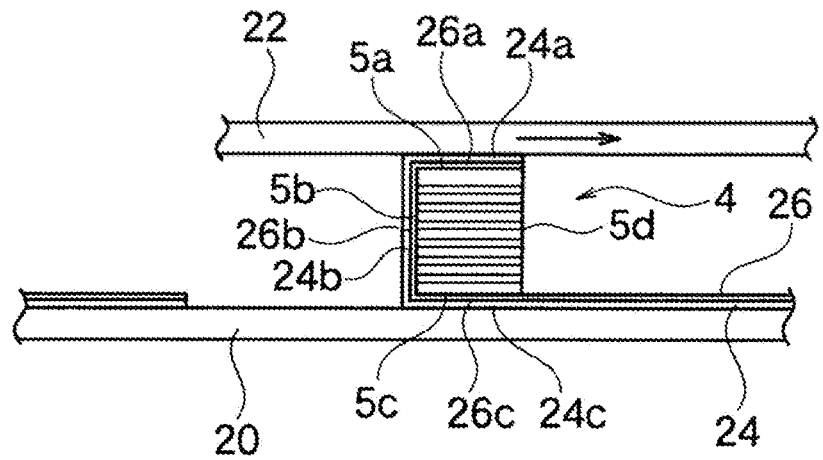
FIG. 7E is a schematic perspective view showing a subsequent step after the step shown in FIG. 7D.

Further, when the second rolling member 22 is moved to the same direction as mentioned in above, as shown in FIG. 7E, the multilayer body 4 is rolled, and the adhesive sheet 26 adheres to the side face 5c of the multilayer body 4 together with the wrapping dielectric sheet 24. Thereby, the outer circumference film 24c which becomes the adhesive film 26c and the insulation layer 16c is formed.

Figure 7F:
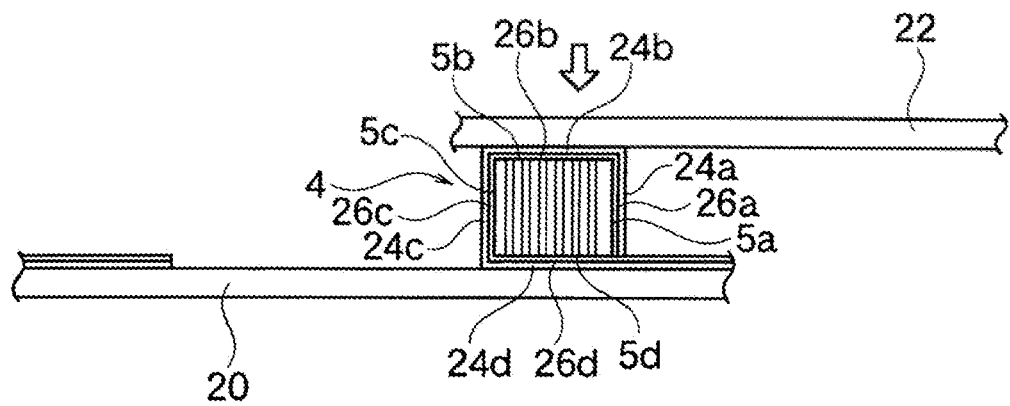
FIG. 7F is a schematic perspective view showing a subsequent step after the step shown in FIG. 7E.

Further, by rolling the multilayer body 4, as shown in FIG. 7F, the multilayer body 4 is rolled and the adhesive sheet 26 adheres to the side face 5d of the multilayer body 4. Thereby, the outer circumference film 24d which becomes the adhesive film 26d and the insulation layer 16d is formed.

Further, as shown in FIG. 7F, by pressing the multilayer body 4 towards the first rolling member 20 from the upper part of the second rolling member 22 to which the multilayer body 4 is adhered, the outer circumference film 24d can be separated from the wrapping dielectric sheet 24. By doing so, the end part of the outer circumference film 24a and the outer circumference film 24d are bonded, and the multilayer body 4 wrapped with the outer circumference films 24a to 24d shown in FIG. 6H can be obtained. The outer circumference films 24a to 24d shown in FIG. 6H become the insulation layers 16a to 16d shown in FIG. 2A after firing.

Third Embodiment

A method of forming an insulation layer to the outer circumference of the multilayer body 4 according to the present embodiment is different from that of the first embodiment and the second embodiment. In below, common parts in the first embodiment and the second embodiment are not described, and the parts which are different from the first embodiment and the second embodiment are mainly described. Hereinbelow, parts which are not described the same as the above-mentioned embodiments.

A method of producing the multilayer ceramic capacitor according to the present embodiment and the method of producing the multilayer ceramic capacitor according to the first embodiment differ in a constitution of a dielectric sheet used in the step of forming the insulation layer around the outer circumference of the multilayer body 4 as shown in FIG. 8A to FIG. 8F.

Figure 8A:
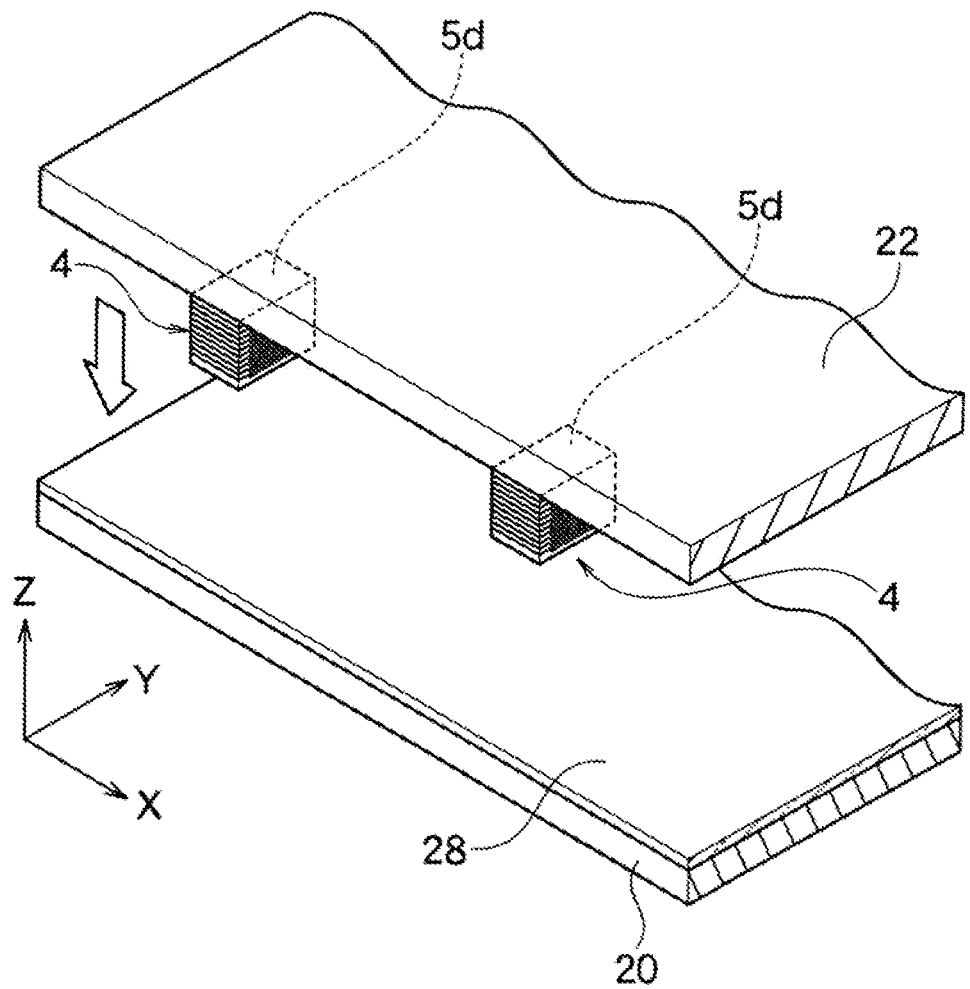
FIG. 8A is a schematic perspective view showing a step during the production of a multilayer ceramic capacitor according to a modified example of the present disclosure.

As shown in FIG. 8A, a wrapping adhesive dielectric sheet 28 is provided on an upper face of the first rolling member 20. The wrapping adhesive dielectric sheet 28 can be produced in the same way as the dielectric sheet 24 of the first embodiment. For example, the dielectric sheet 28 obtains the adhesiveness by adjusting an amount and compositions of adhesive component and the like other than the binder and/or the dispersing medium.

As the binder, for example, ethylcellulose, polyvinyl butyral, and the like can be used; and the amount of the binder is preferably larger than that used in the first embodiment. Also, as the dispersing medium, for example, terpineol, acetone, and the like may be mentioned. As the adhesive components other than these, a synthetic polymer such as polyvinyl butyral, acryl, polyvinyl alcohol, polyvinyl acetate, epoxy, and the like; a natural polymer such as rosin, terpene, and the like; and plasticizers such as dioctyl phthalate, and the like may be mentioned. The amount of such adhesive components is preferably larger than that used in the first embodiment.

Figure 8B:
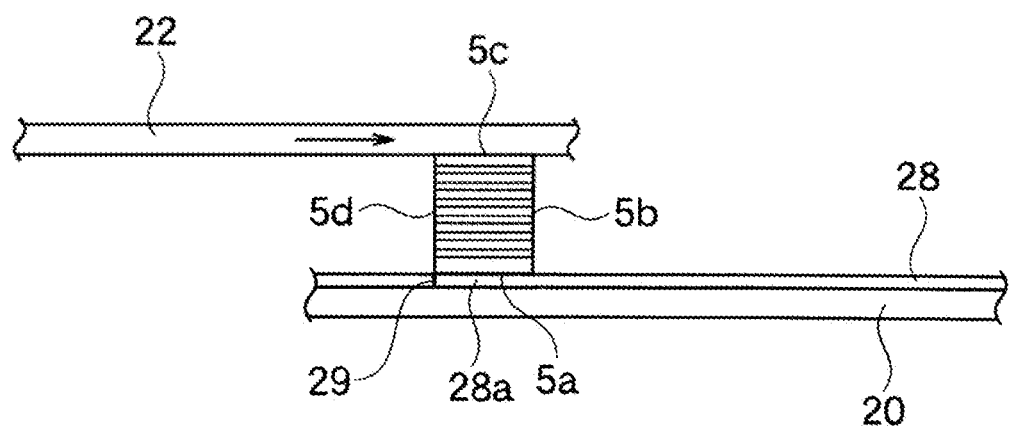
FIG. 8B is a schematic perspective view showing a subsequent step after the step shown in FIG. 8A.

As shown in FIG. 8B, the second rolling member 22 is lowered, and the multilayer body 4 is pressed against the first rolling member 20 using the second rolling member 22. The wrapping adhesive dielectric sheet 28 adheres to the side face 5a of the multilayer body 4, and an outer circumference film 28a which becomes the insulation layer 16a is formed. Also, a slit 29 may be formed to the wrapping adhesive dielectric sheet 28.

Figure 8C:
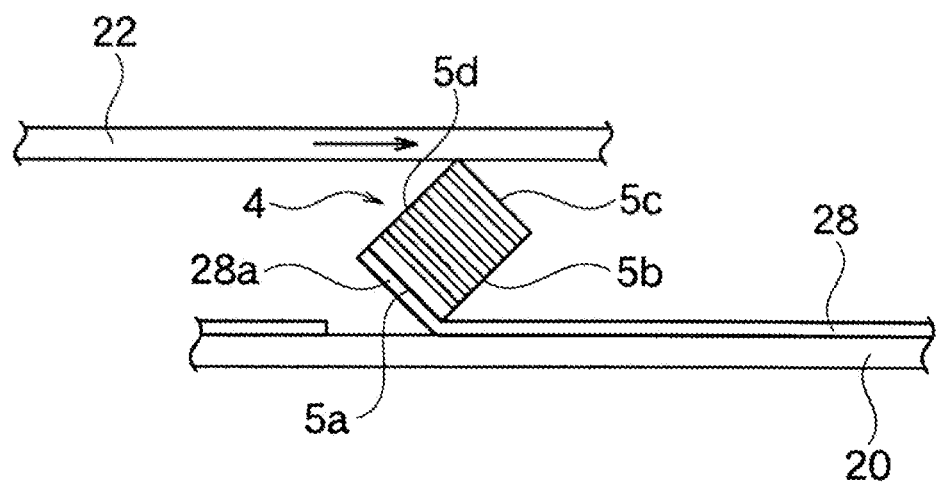
FIG. 8C is a schematic perspective view showing a subsequent step after the step shown in FIG. 8B.

As shown in FIG. 8C, while pressing the multilayer body 4 against the first rolling member 20 using the second rolling member 22, the second rolling member 22 is moved in the direction indicated by the arrow as similar to the aforementioned embodiment to roll the multilayer body 4. Thereby, the outer circumference film 28a adheres to the multilayer body 4, and the outer circumference film 28a is released form the first rolling member 20.

Figure 8D:
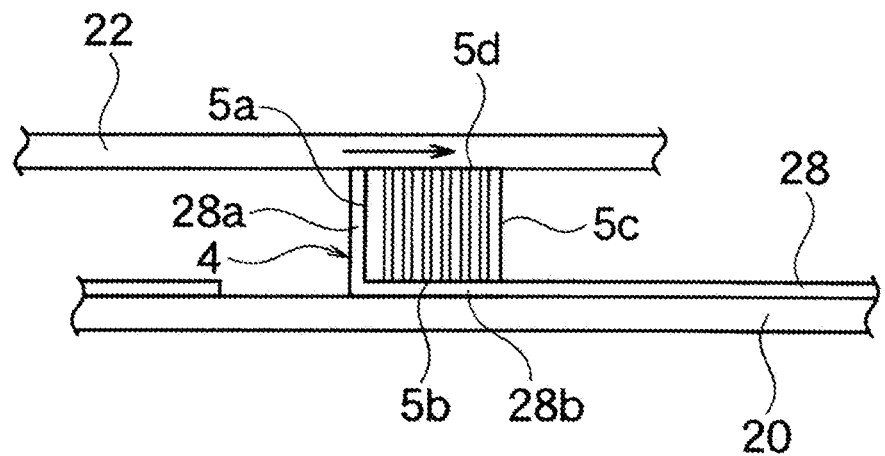
FIG. 8D is a schematic perspective view showing a subsequent step after the step shown in FIG. 8C.
Figure 8E:
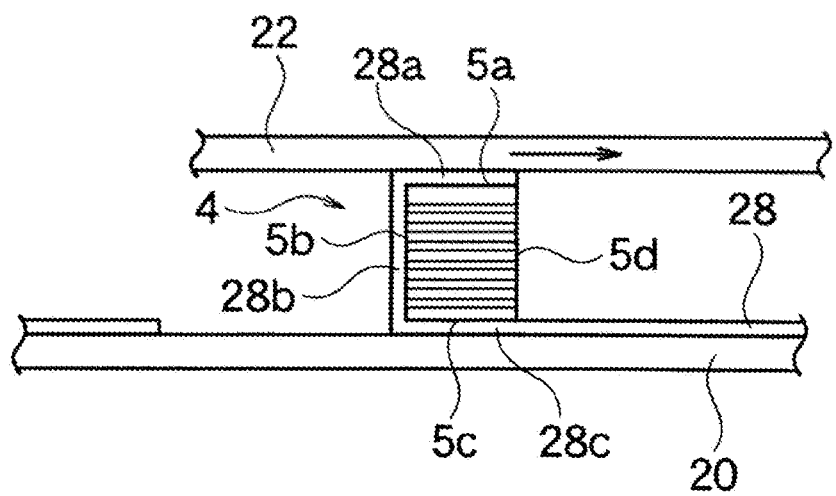
FIG. 8E is a schematic perspective view showing a subsequent step after the step shown in FIG. 8D.

Further, when the second rolling member 22 is moved in the same direction as mentioned in the above, as shown in FIG. 8D, the multilayer body 4 is rolled, and the wrapping adhesive dielectric sheet 28 adheres to the side face 5b of the multilayer body 4. Thereby, the outer circumference film 28b which becomes the insulation layer 16b is formed. Further, when the second rolling member 22 is rolled in the same direction as mentioned in the above, as shown in FIG. 8E, the multilayer body 4 is rolled, and the wrapping adhesive dielectric sheet 28 adheres to the side face 5c of the multilayer body 4. Thereby, the outer circumference film 28c which becomes the insulation layer 16c is formed. By further rolling the multilayer body 4, as shown in FIG. 8F, the wrapping adhesive dielectric sheet 28 adheres to the side face 5d of the multilayer body 4, thereby the outer circumference film 28d which becomes the insulation layer 16d is formed.

Figure 8F:
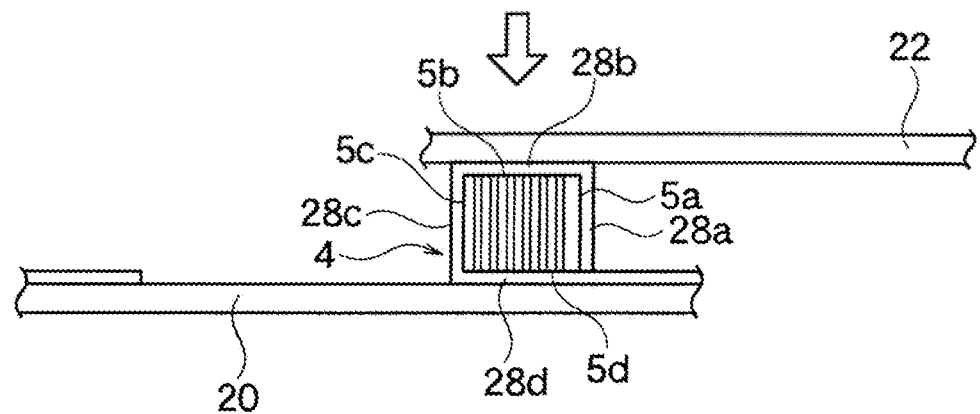
FIG. 8F is a schematic perspective view showing a subsequent step after the step shown in FIG. 8E.
Figure 8G:
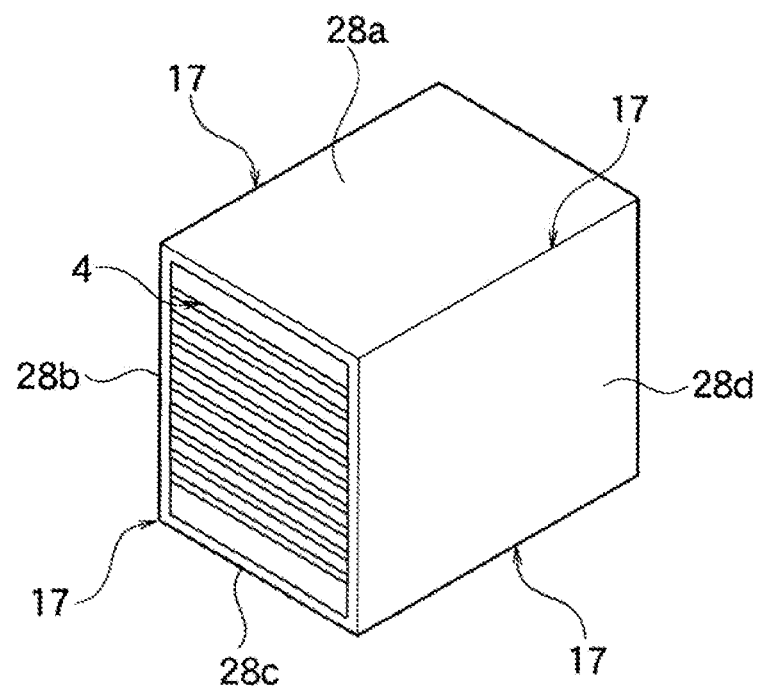
FIG. 8G is a schematic perspective view of a multilayer body which has been released from a sheet after the step shown in FIG. 8F.

Further, as shown in FIG. 8F, by pressing the multilayer body 4 towards the first rolling member 20 from an upper part of the second rolling member 22 to which the multilayer body 4 is adhered, the outer circumference film 28d can be separated from the wrapping adhesive dielectric sheet 28. By doing so, the end part of the outer circumference film 28a and the outer circumference film 28d are bonded, and as shown in FIG. 8G, the multilayer body 4 wrapped with the outer circumference films 28a to 28d can be obtained. The outer circumference films 28a to 28d shown in FIG. 8G become the insulation layers 16a to 16d shown in FIG. 2A after firing.

Note that, in the present embodiment, a cleaning treatment may be performed to the side faces 5a to 5d and/or the end faces 5e and 5f of the multilayer body 4 before the outer circumference films 28a to 28d are wrapped around the multilayer body 4.

In case of performing the cleaning treatment, the surface of the first rolling member 20 and the surface of the second rolling member 22 preferably have an adhesive property. As the first rolling member 20 and the second rolling member 22 having the adhesive property, these may be made of same materials or different materials.

The first rolling member 20 and the second rolling member 22 are not particularly limited, and for example, these may be a sheet that the surface of the sheet material becomes the adhesive face. For example, a foam sheet, a rubber sheet such as silicone, an acryl-based tape, an UV tape (a tape of which the adhesiveness weakens by UV irradiation), and the like may be mentioned. As a resin which constitutes the foam sheet, for example, urethane, acryl, silicone, polyester, polyurethane, and the like may be mentioned.

Figure 9A:
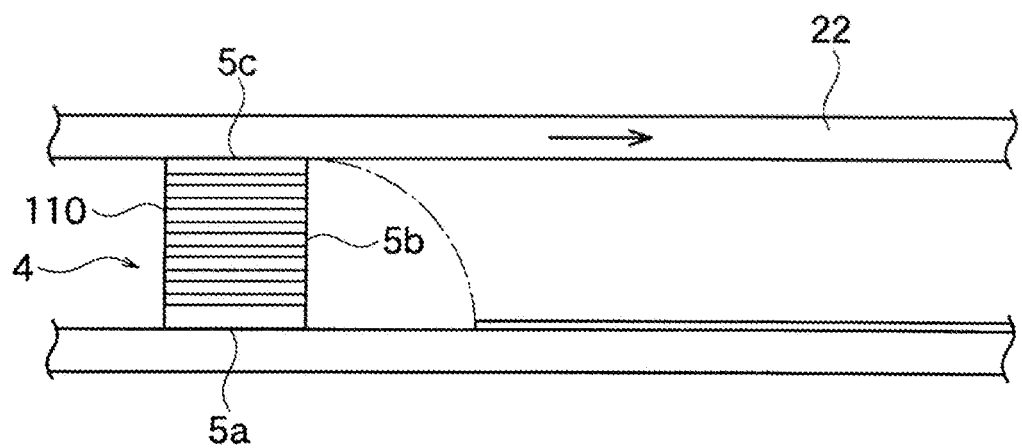
FIG. 9A is a schematic perspective view showing a step of cleaning a surface of the multilayer body.
Figure 9B:
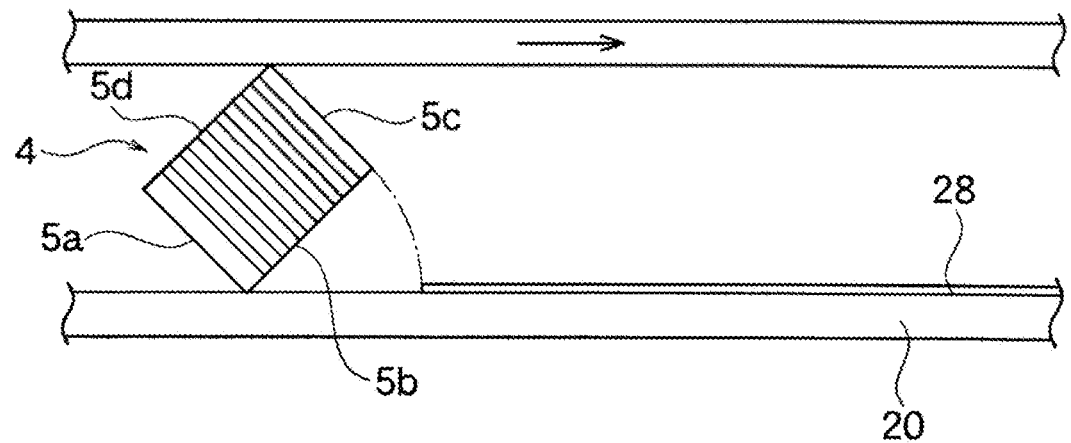
FIG. 9B is a schematic perspective view showing a subsequent step after the step shown in FIG. 9A.

First, as shown in FIG. 9A, the second rolling member 22 is lowered to press the multilayer body 4 against the first rolling member 20 where the wrapping adhesive dielectric sheet 28 is not provided. Next, as shown in FIG. 9B, the second rolling member 22 is moved to the direction indicated by the arrow as similar to the aforementioned embodiments to roll the multilayer body 4. Thereby, the side face 5a of the multilayer body 4 adhered to the first rolling member 20 having adhesiveness and the side face 5c of the multilayer body 4 adhered to the second rolling member 22 having adhesiveness are respectively released from the upper face of the first rolling member 20 and the lower face of the second rolling member 22. When the multilayer body 4 is rolled and the side face 5a and the side face 5c are respectively released from the first rolling member 20 and the second rolling member 22, dusts or so on the side face 5a and the side face 5c are transferred to the contacting surfaces of the first rolling member 20 and the second rolling member 22. Thereby, the side faces 5a and 5c can be cleaned.

Further, as the second rolling member 22 is moved to the direction indicated by the arrow, the multilayer body 4 is rolled, and the side face 5b of the multilayer body 4 adheres to the first rolling member 20 and at the same time the side face 5d of the multilayer body 4 adheres to the second rolling member 22. Here, the position of the side face 5c of the multilayer body 4 matches the position of the end part of the wrapping adhesive dielectric sheet 28.

Further, as the second rolling member 22 is moved to the direction indicated by the arrow, the multilayer body 4 is rolled, and the side face 5b of the multilayer body 4 adhered to the first rolling member 20 and the side face 5d of the multilayer body 4 adhered to the second rolling member 22 are respectively released from the upper face of the first rolling member 20 and the lower face of the second rolling member 22. When the multilayer body 4 is rolled and the side face 5b and the side face 5d are respectively released from the first rolling member 20 and the second rolling member 22, dusts or so on the side face 5b and the side face 5d are transferred to the contacting surfaces of the first rolling member 20 and the second rolling member 22, thereby the side faces 5b and 5d can be cleaned.

That is, when the side faces 5a to 5d of the multilayer body 4 are released from the upper face of the first rolling member 20 and the lower face of the second rolling member 22, debris, dusts, and so on (for example setter debris adhered while firing) adhered to the side faces 5a to 5d of the multilayer body 4 can be removed by adhering these to the upper face of the first rolling member 20 and the lower face of the second rolling member 22.

As shown in FIG. 9B, as the second rolling member 22 is moved to the direction indicated by the arrow as mentioned in above, the multilayer body 4 is rolled, and the side face 5c of the multilayer body 4 adheres to the wrapping adhesive dielectric sheet 28, then the insulation layer 16c is formed. At this point, the multilayer body 4 shown in FIG. 8B is upside down, and as the second rolling member 22 is moved to the direction indicated by the arrow, the cleaning treatment of the multilayer body 4 is performed, and then the step of forming the insulation layers 16a to 16d to the outer circumference of the side faces 5a to 5d of the multilayer body 4 can be performed continuously.

Also, by moving the second rolling member 22 to Y-axis direction from the state shown in FIG. 9A, the multilayer body 4 is rolled in two different directions, thereby the end faces 5e and 5f of the multilayer body 4 can also be cleaned.

Note that, in the present embodiment, the first rolling member 20 and the second rolling member 22 both have the adhesive property. However, the first rolling member 20 does not necessarily have to have an adhesive property. In such case, the position of the multilayer body 4 pressed against the first rolling member 20 is moved to a position away from the end part of the wrapping adhesive dielectric sheet 28 to increase the number of rolling, thereby the side faces 5a to 5d of the multilayer body 4 can be cleaned. Also, by rolling the multilayer body to a different direction, the end faces 5e and 5f od the multilayer body 4 can be cleaned.

Fourth Embodiment

Figure 3A:
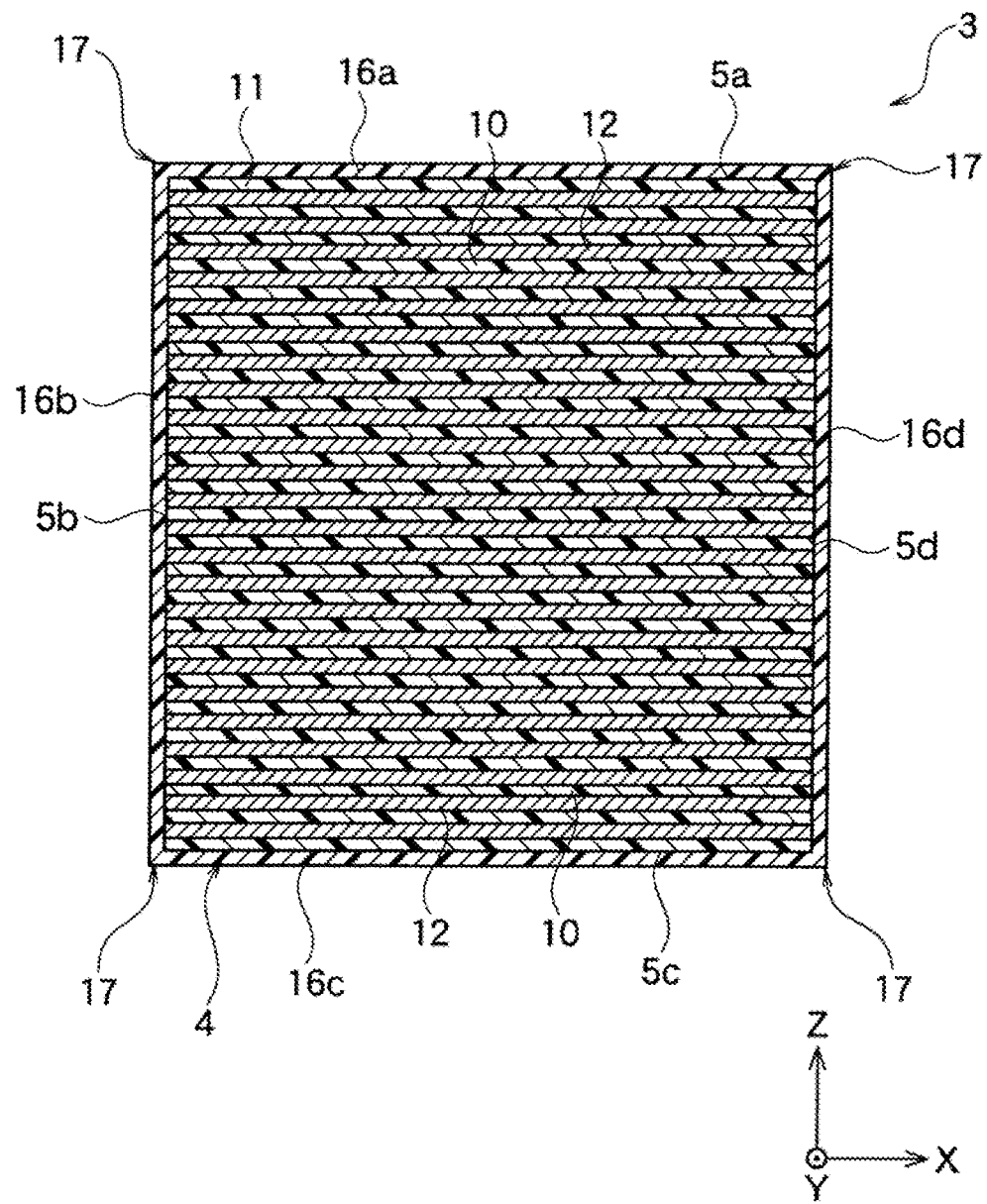
FIG. 3A shows a cross section of a multilayer ceramic capacitor according to another embodiment of the present disclosure.

As shown in FIG. 3A, the constitution of the exterior area 11 of the multilayer body 4 of the multilayer ceramic capacitor according to the present embodiment is different from that of shown in the first to third embodiments. In below, common parts in the first embodiment to third embodiment are not described, and the parts which are different from the above-mentioned embodiments are mainly described. Hereinbelow, parts which are not described are the same as the above-mentioned embodiments.

As the exterior area 11 of the present embodiment, one or more layers of the outer dielectric layers, which are the same dielectric layer as the inner dielectric layer 10, are provided. The thickness of the exterior area 11 of the present embodiment is made extremely thin compared to the exterior area 11 shown in FIG. 2A. Also, in the present embodiment, the exterior area 11 shown in FIG. 3A may not be formed.

That is, in the element body 4, the exterior area 11 of stacking direction (Z-axis direction) of the layers forms the side face; and the insulation layers 16a and 16d are formed to the side faces 5a and 5d of the exterior area 11. In the present embodiment, the thickness of the exterior area 11 is about the same as the thickness of the ceramic layer 10 forming the interior area 13. Note that, the compositions of the insulation layers 16a to 16p may be the same or different of the compositions of the exterior area 11.

In the present embodiment, the exterior area 11 and the inner-dielectric layer 10 are about the same thicknesses, or if the exterior area 11 is not formed, the insulation layers 16a to 16d cover the side faces 5a to 5d of the multilayer body 4. Thus, sufficient protection and strength are attained, and the durability and the moisture resistance of the multilayer ceramic capacitor 2 can be improved, which improves the reliability even after the use for long period of time.

Fifth Embodiment

Figure 3B:
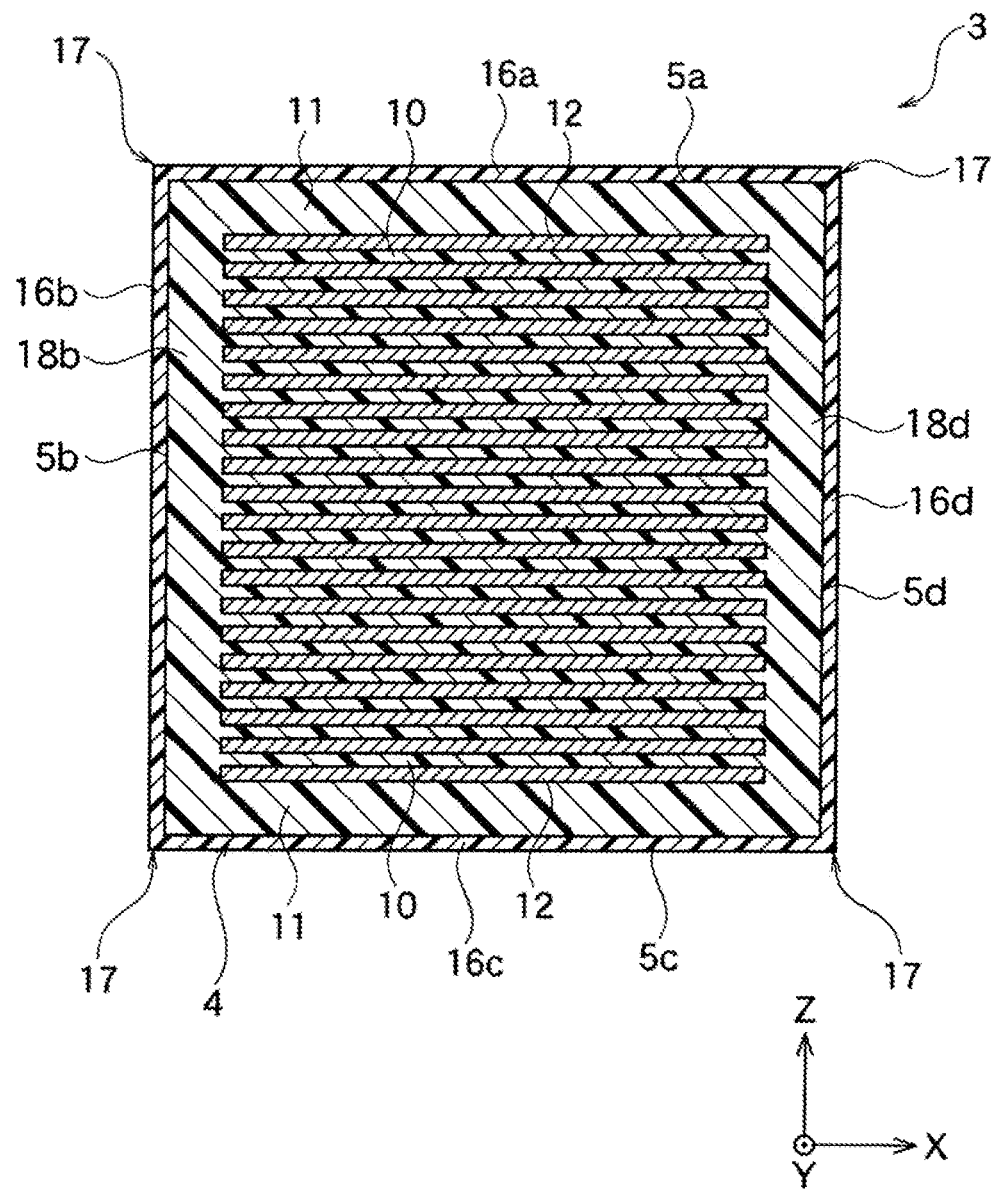
FIG. 3B shows a cross section of a multilayer ceramic capacitor according to further another embodiment of the present disclosure.

As shown in FIG. 3B, the constitution of the end part of the inner-dielectric layer 10 and the internal electrode layer 12 of the multilayer ceramic capacitor according to the present embodiment is different from that of the first to fourth embodiments. In below, common parts are not described, and the parts which are different from the above-mentioned embodiments are mainly described. Hereinbelow, parts which are not described are the same as the above-mentioned embodiments.

In the present embodiment, dielectric gap parts 18b and 18d are formed at the both ends in X-axis direction of the inner-dielectric layer 10 and the internal electrode layer 12. That is, the outer side in X-axis direction of the dielectric gap parts 18b and 18d form the side faces 5b and 5d of the multilayer body 4. Since, the dielectric gap parts 18b and 18d are formed as such, the end parts of the internal electrode layer are covered by the dielectric gap parts 18b and 18d. Thus, the durability and the moisture resistance of the multilayer ceramic capacitor 2 are improved and the reliability after the use of long period of time can be improved as well.

Figure 5B:
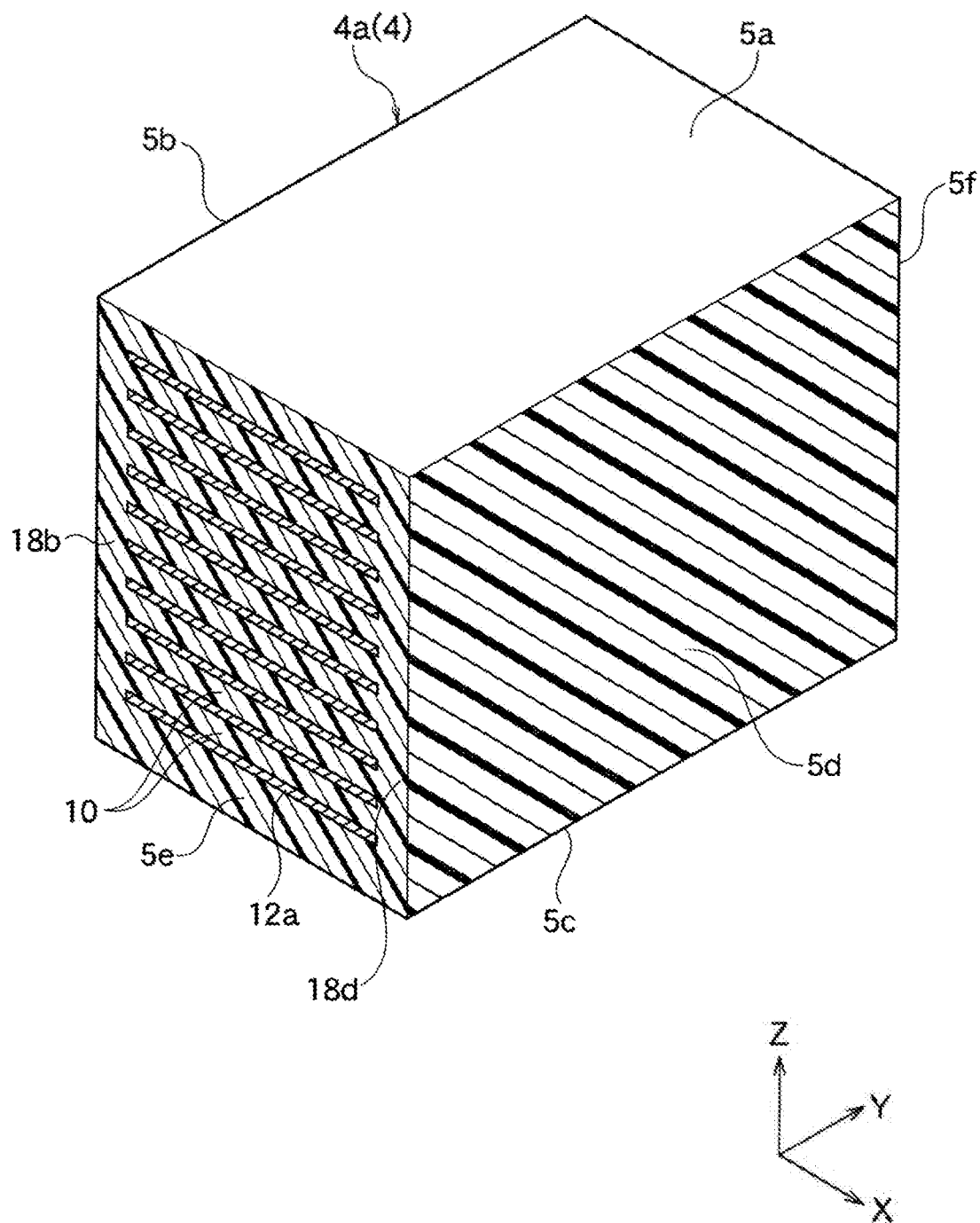
FIG. 5B is a schematic perspective view of a multilayer body after a cutting step of the production of the multilayer ceramic capacitor according to other embodiments of the present disclosure.

In the present embodiment, a step of firing the green chip 4a shown in FIG. 5B is carried out and then a step of forming the insulation layers 16a to 16d is carried out as mentioned in above, thereby the multilayer body 4 of the present embodiment is obtained. The green chip 4a shown in FIG. 5B is obtained by changing a pattern shape of the internal electrode pattern layer 12a during the production step of the aforementioned multilayer body. That is, the green chip 4a is obtained in a pattern shape such that the internal electrode pattern layer 12a is disconnected at C1 cross section shown in FIG. 4A.

Figure 3C:
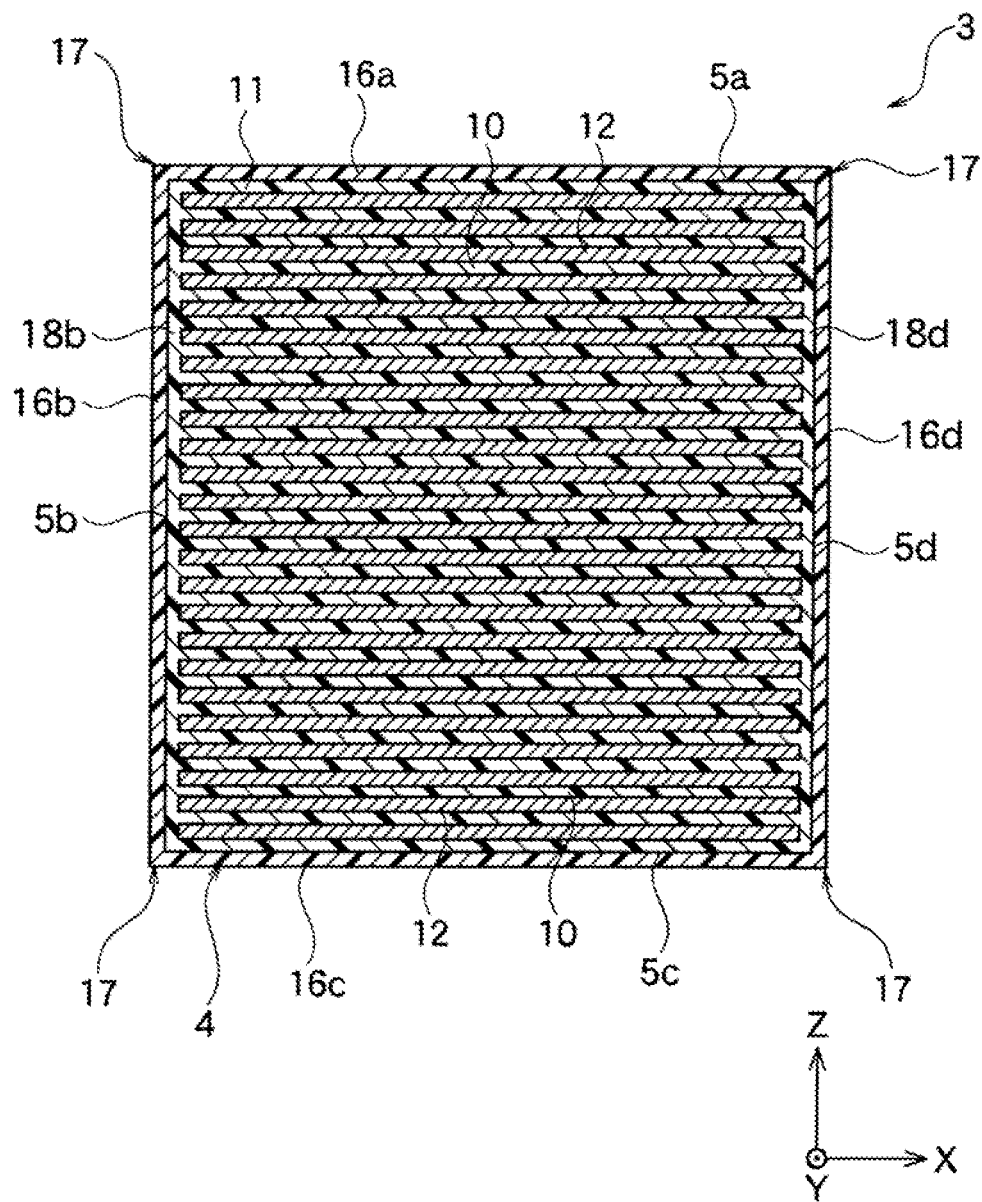
FIG. 3C shows a cross section of a multilayer ceramic capacitor according to further another embodiment of the present disclosure.

Note that, in FIG. 3C, the insulation layer is formed to the outer circumference of the multilayer body 4 where the thickness of the exterior area 11 (including the dielectric gap parts 18b and 18d) shown in FIG. 3B is about the same thickness as the dielectric layer 10 forming the interior area. Even in case of such structure, it is the same as the present embodiment.

Note that, the present disclosure is not limited to the embodiments mentioned in above, and the present disclosure may be variously modified within a scope of the present disclosure.

For example, the multilayer ceramic capacitor 2 of the first embodiment shown in FIG. 1 may not have at least one of the outer-dielectric layers 11 and 11. Also, in the above-mentioned embodiment, the main component of the insulation layers 16a to 16d may be constituted by components other than dielectrics, and for example, the insulation layers 16a to 16d may be constituted by ceramics, aluminum, epoxy resins, polyimide resins, and the like.

Further, the electronic component according to the present disclosure is not limited to the multilayer ceramic capacitor, and it can be applied to other electronic components. As other electronic components, various types of electronic components such that functional parts are formed to side faces (such as an outer face other than the outer face provided with the terminal electrode) of the element body. For example, band pass filters, chip inductors, multilayer 3-terminal filters, piezoelectric elements, chip thermistors, chip varistors, chip resistors, and other surface mounting chip type electronic components may be mentioned.

2 . . . Multilayer ceramic capacitor
3 . . . Element body with insulation layers
4 . . . Multilayer body (element body)
4a . . . Green chip
5a to 5d . . . Side faces
5e, 5f . . . End faces
6 . . . First terminal electrode 6a . . . Electrode paste film
8 . . . Second terminal electrode
10 . . . Inner-dielectric layer (ceramic layer)
10a . . . Inner-green sheet
11 . . . Exterior area (ceramic layer)
11a . . . Outer-green sheet
12 . . . Internal electrode layer
12α,12β . . . Lead parts
12a . . . Internal electrode pattern layers
13 . . . Interior area
14 . . . Capacity area
15A, 15B . . . Lead areas
16a, 16b, 16c, 16d, 16p . . . Insulation layer
16a1, 16b1, 16c1, 16d1 . . . Outer circumference face
17 . . . Corner part
18b, 18d . . . Dielectric Gap part
20 . . . First rolling member
22 . . . Second rolling member
24 . . . Dielectric sheet
24a, 24b, 24c, 24d . . . Outer circumference film
25 . . . Slit
26 . . . Adhesive sheet
26a, 26b, 26c, 26d . . . Adhesive film
28 . . . Adhesive dielectric sheet
28a, 28b, 28c, 28d . . . Outer circumference film
29 . . . Slit

What is claimed is:

1. An electronic component comprising an element body having a plurality of side faces along a circumference direction, wherein
    the element body comprises an insulation layer which covers the plurality of side faces in a continuous manner along the circumference direction,
    corner portions where the side faces of the element body intersect are formed into chamfered portions or curved portions,
    the insulation layer is formed at a constant thickness along the chamfered portions or curved portions at the corner portions,
    a property of the insulation layer including parts of the insulation layer formed at the corner portions is substantially consistent along the circumference direction, and
    a pore ratio at a predetermined depth from a surface of the insulation layer on a corner part of the element body is substantially the same as a pore ratio at a predetermined depth from the surface of the insulation layer on at least one side face among two side faces of the plurality of side faces of the element body connecting to the corner part.

2. An electronic component comprising an element body having a plurality of side faces along a circumference direction, wherein
    the element body comprises an insulation layer which covers the plurality of side faces in a continuous manner along the circumference direction,
    corner portions where the side faces of the element body intersect are formed into chamfered portions or curved portions,
    the insulation layer is formed at a constant thickness along the chamfered portions or curved portions at the corner portions,
    a property of the insulation layer including parts of the insulation layer formed at the corner portions is substantially consistent along the circumference direction, and
    a pore ratio at a predetermined depth from a surface of the insulation layer is substantially consistent along the circumference direction.

3. An electronic component comprising an element body having a plurality of side faces along a circumference direction, wherein
    the element body comprises an insulation layer which covers the plurality of side faces in a continuous manner along the circumference direction,
    corner portions where the side faces of the element body intersect are formed into chamfered portions or curved portions,
    the insulation layer is formed at a constant thickness along the chamfered portions or curved portions at the corner portions,
    a property of the insulation layer including parts of the insulation layer formed at the corner portions is substantially consistent along the circumference direction,
    the insulation layer comprises ceramic particles, and
    particle sizes of the ceramic particles at a predetermined depth from a surface of the insulation layer are substantially the same along the circumference direction.

4. An electronic component comprising an element body having a plurality of side faces along a circumference direction, wherein
    the element body comprises an insulation layer which covers the plurality of side faces in a continuous manner along the circumference direction,
    corner portions where the side faces of the element body intersect are formed into chamfered portions or curved portions,
    the insulation layer is formed at a constant thickness along the chamfered portions or curved portions at the corner portions,
    a property of the insulation layer including parts of the insulation layer formed at the corner portions is substantially consistent along the circumference direction, and
    the insulation layer comprises dielectrics including ceramic particles having particle sizes which are substantially the same or different of particle sizes of ceramic particles of a dielectric layer included in the element body.

5. The electronic component according to claim 4, wherein the insulation layer comprises dielectrics having a composition substantially the same or different of dielectrics included in a dielectric layer of the element body.

6. The electronic component according to claim 5, wherein the element body has a multilayer structure in which the dielectric layer and an internal electrode layer are stacked.

7. The electronic component according to claim 6, wherein an exterior area in a stacking direction of layers constitute at least one of the side faces of the element body, and the insulation layer is formed to the side faces of the exterior area.

8. The electronic component according to claim 7, wherein the exterior area is formed thicker than the dielectric layer which is included in an interior area of the element body.

9. The electronic component according to claim 7, wherein a thickness of the exterior area is about the same as a thickness of the dielectric layer which is included in an interior area of the element body.

10. The electronic component according to claim 7, wherein the exterior area is also formed to a face in a perpendicular direction to the stacking direction of the element body.

11. The electronic component according to claim 7, wherein the dielectric layer comprises dielectric layers and at least one of the dielectric layers forms the exterior area.

12. The electronic component according to claim 7, wherein a composition of the insulation layer and a composition of the exterior area are different.

13. An electronic component comprising an element body having a plurality of side faces along a circumference direction, wherein
    the element body comprises an insulation layer which covers the plurality of side faces in a continuous manner along the circumference direction,
    corner portions where the side faces of the element body intersect are formed into chamfered portions or curved portions,
    the insulation layer is formed at a constant thickness along the chamfered portions or curved portions at the corner portions,
    a property of the insulation layer including parts of the insulation layer formed at the corner portions is substantially consistent along the circumference direction,
    the insulation layer comprises dielectrics having a composition substantially the same or different of dielectrics included in a dielectric layer of the element body, and
    the insulation layer includes a larger amount of a component which improves a sinterability of the insulation layer compared to an amount of the component included the dielectric layer of the element body.

14. The electronic component according to claim 13, wherein a terminal electrode connecting with an exposed end of an internal electrode layer is formed at an end face of the element body which is located to cross with the plurality of side faces of the element body.

15. The electronic component according to claim 14, wherein an edge of the terminal electrode covers an end of the insulation layer.

16. The electronic component according to claim 13, wherein the dielectric layer comprises dielectric layers and an internal electrode layer comprises internal electrode layers,
    the insulation layer is formed on the plurality of side faces of the element body so that exposed ends of the internal electrode layers are covered with the insulation layer, and
    a position variation of the exposed ends of the internal electrode layers which contact with the insulation layer is within a predetermined range.

17. The electronic component according to claim 13, wherein the plurality of side faces continuous along the circumference direction of the element body is entirely covered by the insulation layer.

18. The electronic component according to claim 13, wherein the insulation layer has a discontinuous part at one side face among the plurality of side faces of the element body.

19. The electronic component according to claim 13, wherein the insulation layer has an approximately uniform composition along the circumference direction.

20. The electronic component according to claim 13, wherein a thickness of the insulation layer is 3 µm to 40 µm.

* * * * *